United States Patent
Cheng et al.

(10) Patent No.: US 12,462,156 B2
(45) Date of Patent: Nov. 4, 2025

(54) TRAINING METHOD, APPARATUS, AND DEVICE FOR FEDERATED NEURAL NETWORK MODEL, COMPUTER PROGRAM PRODUCT, AND COMPUTER-READABLE STORAGE MEDIUM

(71) Applicant: Tencent Technology (Shenzhen) Company Limited, Guangdong (CN)

(72) Inventors: Yong Cheng, Guangdong (CN); Huanran Xue, Guangdong (CN); Fangcheng Fu, Guangdong (CN); Yangyu Tao, Guangdong (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 640 days.

(21) Appl. No.: 17/956,490

(22) Filed: Sep. 29, 2022

(65) Prior Publication Data

US 2023/0023520 A1    Jan. 26, 2023

Related U.S. Application Data

(63) Continuation of application No. PCT/CN2021/124780, filed on Oct. 19, 2021.

(30) Foreign Application Priority Data

Oct. 27, 2020  (CN) .......................... 202011167325.0

(51) Int. Cl.
    *G06N 3/08* (2023.01)
    *G06N 3/045* (2023.01)

(52) U.S. Cl.
    CPC .............. *G06N 3/08* (2013.01); *G06N 3/045* (2023.01)

(58) Field of Classification Search
    CPC .......... G06N 3/08; G06N 3/045; G06N 3/098; G06N 3/084; G06N 5/046; G06F 21/602
    See application file for complete search history.

(56) References Cited

U.S. PATENT DOCUMENTS

| 2017/0278289 A1* | 9/2017 | Marino .................... G06T 7/536 |
| 2019/0296910 A1* | 9/2019 | Cheung .................. G06N 3/047 |

(Continued)

FOREIGN PATENT DOCUMENTS

| CN | 109165725 A | 1/2019 |
| CN | 109871702 A | 6/2019 |

(Continued)

OTHER PUBLICATIONS

International Search Report and Written Opinion mailed Jan. 20, 2022 for International Application No. PCT/CN2021/124780.

(Continued)

*Primary Examiner* — Angelica Ruiz
(74) *Attorney, Agent, or Firm* — Crowell & Moring, LLP

(57) ABSTRACT

Embodiments of this application provide a training method, apparatus, and device for a federated neural network model, a computer program product, and a computer-readable storage medium. The method includes: performing forward computation processing of sample data through a first model, to obtain an output vector of the first model; performing forward computation processing through the interaction layer of the output vector of the first bottom model, at last one model parameter of an interaction layer, and at least one encrypted model to obtain an output vector of the interaction layer; performing forward computation processing on the output vector of the interaction layer through the second model, to obtain an output vector of the federated neural network model; back propagating the federated neural network model according to a loss result corresponding to the output vector of the federated neural network model, (Continued)

and updating the at least one model parameter of the interaction layer, a parameter of the first bottom model, and a parameter of the top model according to a back propagation processing result; and obtaining a trained federated neural network model based on the updated model parameters of the interaction layer, the first bottom model, and the second model.

20 Claims, 13 Drawing Sheets

(56) References Cited

U.S. PATENT DOCUMENTS

2020/0064444 A1* 2/2020 Regani .................. G01S 7/006
2020/0134203 A1* 4/2020 Kurian .................. G06F 21/31

FOREIGN PATENT DOCUMENTS

| CN | 111210003 A | 5/2020 |
| CN | 111737922 A | 10/2020 |
| CN | 112149171 A | 12/2020 |

OTHER PUBLICATIONS

Search Report dated Feb. 20, 2021 for Chinese Application No. 202011167325.0.
Office Action dated Mar. 1, 2021 for Chinese Application No. 202011167325.0.
https://zhuanlan.zhihu.com/p/157710540; Jul. 8, 2020; 12 pages.

* cited by examiner

| Participant A | | Participant B |
|---|---|---|
| S131: Encrypt $[\varepsilon_{acc}] = \text{RIAC}(\varepsilon_{acc})$ | | S131: Calculate a loss function, calculate a gradient of a model loss function to a top model, and update a model parameter of the top model |
| Generate noise $\varepsilon_A$<br>Obtain through encryption: $\left[\dfrac{\varepsilon_A}{\eta}\right]$<br>S132: Obtain through decryption: $\delta_{xu\_A}\alpha_A + \varphi_B\theta_B$<br>Calculate:<br>$u_A = \delta_{xu\_A}\alpha_A + \dfrac{\varepsilon_A}{\eta} + \varphi_B\theta_B$<br>Update cumulative noise<br><br>S134: Decrypt $[\delta_{bottom\_A}]$ | $\delta_{xu\_A}[\alpha_A] + \varphi_B[\theta_B]$ ←<br><br>$u_A \cdot [\varepsilon_{xu}] \neq \left[\dfrac{\varepsilon_A}{\eta}\right]$ →<br><br>$[\delta_{bottom\_A}]$ ← | S132: Calculate a gradient $\delta_{xu\_A}$<br>Generate noise $\varphi_B$<br>Calculate: $\delta_{xu\_A}[\alpha_A] + \varphi_B[\theta_B]$<br>S133: Update the model parameter of the interaction layer in the form of plaintext<br>S134: Calculate: $[\delta_{bottom\_A}] = \delta_{xu\_A}([W_A]) + [\varepsilon_{xu}])$<br><br>S135: Calculate the gradient of the model loss function, and update the model parameter of the interaction layer<br>S136: Calculate: $\delta_{bottom\_B} = \delta_{xu\_B}W_B$ |
| S137: Use $\delta_{bottom\_A}$ to continue to back propagate and update a model parameter of a bottom model | | S137: Use $\delta_{bottom\_B}$ to continue to back propagate and update a model parameter of a bottom model |

FIG. 13

TRAINING METHOD, APPARATUS, AND DEVICE FOR FEDERATED NEURAL NETWORK MODEL, COMPUTER PROGRAM PRODUCT, AND COMPUTER-READABLE STORAGE MEDIUM

RELATED APPLICATION

This application is a continuation of and claims the benefit of priority to PCT International Application No. PCT/CN2021/124780 filed on Oct. 19, 2021, which is based on and claims the benefit of priority to the Chinese Patent Application No. 202011167325.0 filed on Oct. 27, 2020. These prior patent applications are incorporated herein by reference in their entireties.

FIELD OF THE TECHNOLOGY

Embodiments of this application generally relate to the field of Internet technologies, and particularly relate to, but is not limited to, a training method, apparatus, and device for a federated neural network model, and correspondingly, a computer program product, and a computer-readable storage medium.

BACKGROUND OF THE DISCLOSURE

Federated learning (FL) may be used to train a deep learning model (that is, an artificial neural network model (ANN)) and provide model prediction services by using multi-party data sources without the need of limiting to data domains. Federated learning improves the performance of the deep learning model through full multi-party data cooperation while ensuring user privacy and data security. For example, it can be ensured that multi-party data cooperation meets the requirements of data protection laws and regulations while the accuracy of model recommendation is improved. In particular, vertical federated learning may combine multi-party data sources to expand the dimension of a data feature or obtain data label information, to train the model better. Vertical federated learning may significantly improve the performance of the deep learning model.

In the technical solution of two-party vertical federated neural network training in the related art, an encryption solution with modular exponentiation and modular inversion operations is usually used to protect private data information of the training participant. However, the decryption process has excessively high computation complexity and a large computation demand, and takes a long computation time.

SUMMARY

Embodiments of this application provide a training method, apparatus, and device for a federated neural network model, and correspondingly, a computer program product, and a computer-readable storage medium, which can perform encryption on a model parameter of an interaction layer, thereby improving computing efficiency of a training process.

The technical solutions in the embodiments of this application are implemented as follows.

An embodiment of this application provides a training method for a federated neural network model, the federated neural network model including a first model corresponding to a first training participant, a second model corresponding to a second training participant, and an interaction layer. The method includes: performing forward computation processing on sample data through the first model, to obtain an output vector of the first model; performing forward computation processing on the output vector of the first model, a model parameter of the interaction layer, and an encrypted model parameter through the interaction layer, to obtain an output vector of the interaction layer, the model parameter of the interaction layer being obtained by performing linear operation-based encryption processing by a training device of the first training participant on the model parameter of the interaction layer; performing forward computation processing on the output vector of the interaction layer through the second model, to obtain an output vector of the federated neural network model; performing back propagation processing on the federated neural network model according to a loss result corresponding to the output vector of the federated neural network model, and updating the model parameter of the interaction layer, a parameter of the first model, and a parameter of the second model according to a back propagation processing result; and generating a trained federated neural network model based on updated model parameters of the interaction layer, the first model, and the second model.

An embodiment of this application provides a training apparatus for a federated neural network model, the federated neural network model including a first model corresponding to a first training participant, a second model corresponding to a second training participant, and an interaction layer. The apparatus includes: a first input module, configured to perform forward computation processing on sample data through the first model, to obtain an output vector of the first model; a second input module, configured to perform forward computation processing on the output vector of the first model, a model parameter of an interaction layer, and an encrypted model parameter through the interaction layer, to obtain an output vector of the interaction layer, the model parameter of the interaction layer being obtained by performing linear operation-based encryption processing by a training device of the first training participant on the model parameter of the interaction layer; a third input module, configured to perform forward computation processing on the output vector of the interaction layer through the second model, to obtain an output vector of the federated neural network model; and a back propagation module, configured to perform back propagation processing on the federated neural network model according to a loss result corresponding to the output vector of the federated neural network model, and the model parameter of the interaction layer, a parameter of the first model, and a parameter of the second model are updated according to a back propagation processing result; and generate a trained federated neural network model based on updated model parameters of the interaction layer, the first model, and the second model.

An embodiment of this application provides a computer program product or a computer program, the computer program product or the computer program including computer instructions, the computer instructions being stored in a computer-readable storage medium. A processor of the training device reads the computer instructions from the computer-readable storage medium, and the processor is configured to execute the computer instructions to implement the foregoing training method for a federated neural network model.

An embodiment of this application provides a training device for a federated neural network model, including: a memory, configured to store executable instructions; and a processor, configured to perform, when executing the executable instructions stored in the memory, the foregoing training method for a federated neural network model.

An embodiment of this application provides a computer-readable storage medium storing executable instructions, the executable instructions, when executed by a processor, implementing the foregoing training method for a federated neural network model.

The embodiments of this application have the following beneficial effects: The federated neural network model includes a first model of a first training participant, an interaction layer, a second model of a second training participant, so that collaborative training may be performed in conjunction with the first training participant and the second training participant. During the training, randomized iterative affine cipher-based encryption may be performed on a model parameter of the interaction layer, thereby greatly reducing computation complexity, a computation amount, and a time for computation while ensuring the security of the collaborative training.

BRIEF DESCRIPTION OF THE DRAWINGS

FIG. 13 is a flowchart of back propagation for two-party vertical federated neural network model training based on an RIAC according to an embodiment of this application.

DESCRIPTION OF EMBODIMENTS

Figure 1:
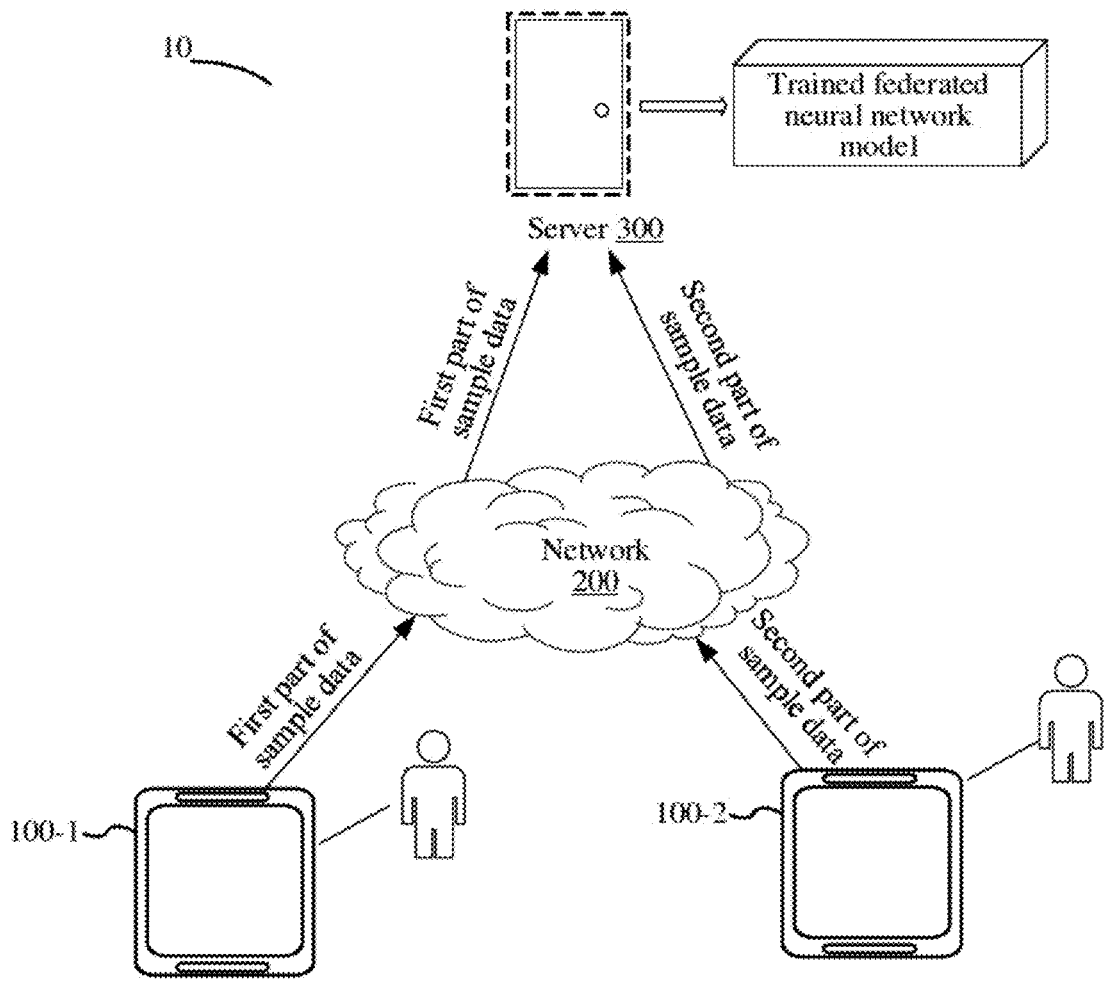
FIG. 1 is an example schematic architecture diagram of a federated neural network model training system according to an embodiment of this application.

To illustrate the objectives, technical solutions, and advantages of this application, the following describes this application in further detail with reference to the accompanying drawings. The described embodiments are not to be considered as a limitation to this application. All other embodiments obtained/derived by a person having ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict. Unless otherwise defined, meanings of all technical and scientific terms used in the embodiments of this application are the same as those usually understood by a person skilled in the art to which the embodiments of this application belong. Terms used in the embodiments of this application are merely intended to describe objectives of the embodiments of this application, but are not intended to limit this application.

In the technical solution of two-party vertical federated neural network training in the related art, a homomorphic encryption solution is usually used to protect data privacy information of a training participant (or "participant" for simplicity), or similarly, an encryption solution with modular exponentiation and modular inversion operations is used to protect the data privacy information of the training participant. However, decryption and encryption processes of the homomorphic encryption solution needs to perform massive modular exponentiation and modular inversion operations, which has high computation complexity, a large computation demand, and need a longer time for computation, and is not suitable for vertical federated neural network model training and model inference services in an actual application scenario.

The technical solution provided in the embodiments of this application may effectively resolve the problem of an excessively large computation amount of encryption and decryption in the vertical federated neural network model training and model inference processes. In the technical solution provided in the embodiments of this application, the data privacy information of the training participant in the vertical federated neural network model training and model inference processes is protected through a randomized iterative affine cipher (RIAC)-based privacy protection protocol. In the RIAC-based encryption solution, no modular exponentiation and modular inversion operations is involved in the encryption and decryption processes. Instead, only a linear operation is involved, which has extremely low computation complexity and is suitable for model training and inference services that are actually applied to large-scale neural network models. Further, compared with the homomorphic encryption solution, the RIAC-based encryption solution not only has a smaller computation amount, but also obtains/generates a shorter ciphertext, which can reduce communication overheads in federated learning.

Exemplary applications of a training device for a federated neural network model provided in this embodiment of this application are described below. In an implementation, the training device for a federated neural network model provided in this embodiment of this application may be implemented as any terminal such as a notebook computer, a tablet computer, a desktop computer, a mobile device (for example, a mobile phone, a portable music player, a personal digital assistant, a dedicated messaging device, or a portable game device), or an intelligent robot. In another implementation, the training device for a federated neural network model provided in this embodiment of this application may also be implemented as a server. An exemplary application in which the training device for a federated neural network model is implemented as the server is described below.

Referring to FIG. 1, FIG. 1 is an example schematic architecture diagram of a federated neural network model training system 10 according to an embodiment of this application. The description is made to this embodiment of this application by using an example in which a two-party vertical federated neural network model is a to-be-trained neural network model. To implement training of the federated neural network model, a federated neural network model training system 10 provided in this embodiment of this application includes a first terminal 100-1, a second terminal 100-2, a network 200, and a server 300. The first terminal 100-1 is a terminal of a first participant, the second terminal 100-2 is a terminal of a second participant, a first participant A (for example, an advertising company) cooperates with a second participant B (for example, a social network platform) to complete the training of the federated neural network model, that is, one or more personalized recommendation models based on deep learning are jointly trained, the personalized recommendation model including a first model and a second model. The first participant A has a part of data features, for example, (X1, X2, . . . , X40), which has 40-dimensional data features in total; and the second participant B has another part of data features, for example, (X41, X42, . . . , X100), which has 60-dimensional data features in total. More data features are obtained by combining the first participant A and the second participant B, and there are 100-dimensional data features by adding data features A and B, so that a feature dimension of training data is significantly expanded. For supervised deep learning, at least one of the first participant A and the second participant B has label information Y of the training data.

Before model training is performed, the first participant A transmits first part of sample data to the server 300 by using the first terminal 100-1 through the network 200, the second participant B transmits second part of sample data to the server 300 by using the second terminal 100-2 through the network 200, and the server performs model training after acquiring the sample data, where the training is performed as follows:

performing forward computation processing on the sample data through a first bottom model (the first model) running on a training device of the first participant, to obtain an output vector of the first bottom model;

performing forward computation processing on the output vector of the first bottom model, a model parameter of an interaction layer, and an encrypted model parameter through the interaction layer, to obtain an output vector of the interaction layer, the model parameter of the interaction layer being obtained by performing linear operation-based encryption processing by a training device of the first participant on the model parameter of the interaction layer;

performing forward computation processing on the output vector through a top model (the second model) running on a training device of the second participant, to obtain an output vector of the federated neural network model;

performing back propagation processing on the federated neural network model according to a loss result corresponding to the output vector of the federated neural network model, and updating the model parameter of the interaction layer, a parameter of the first bottom model, and a parameter of the top model according to a back propagation processing result; and obtaining a trained federated neural network model based on updated model parameters of the interaction layer, the first bottom model, and the top model.

Figure 14:
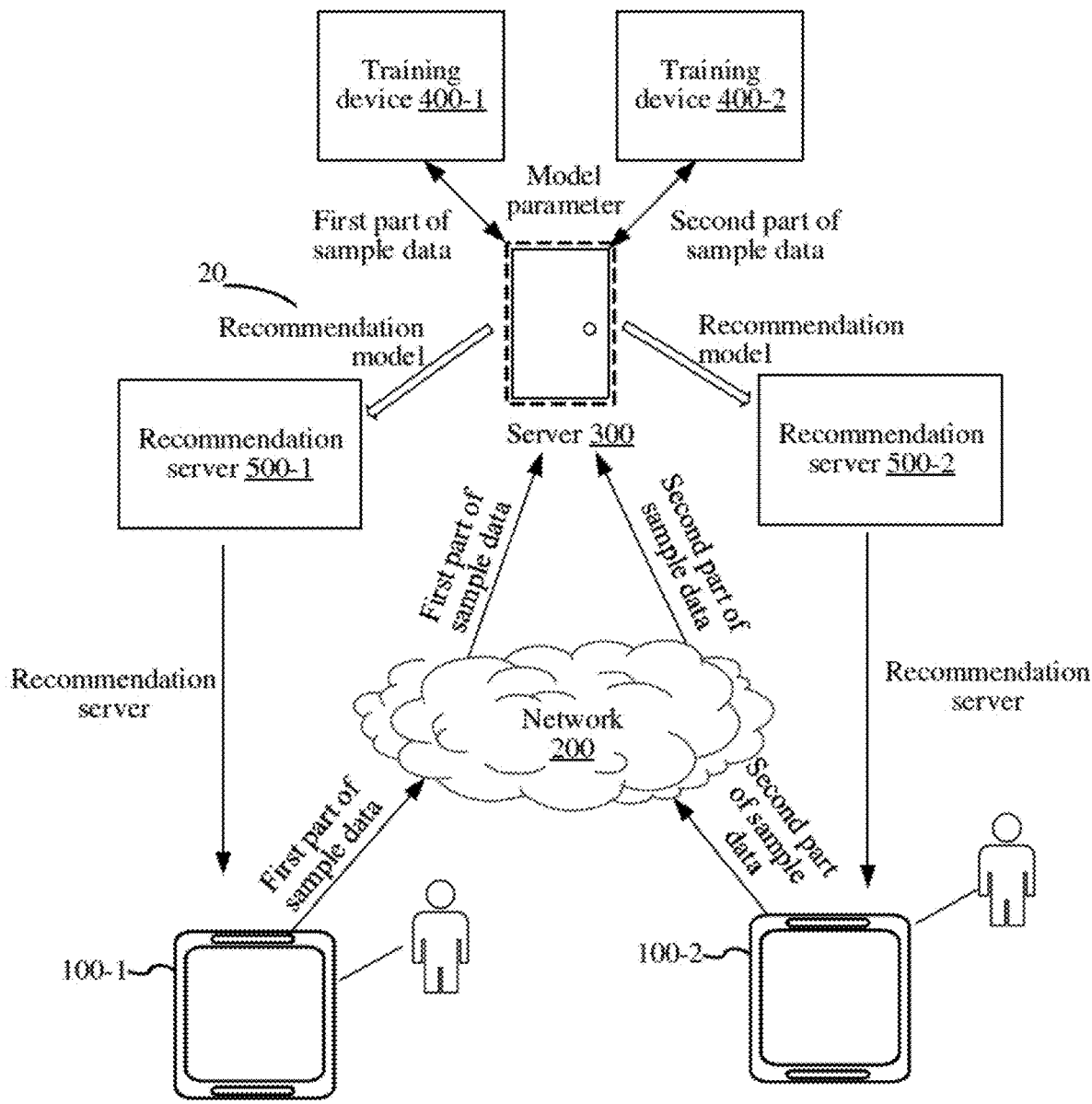
FIG. 14 is an example schematic architecture diagram of a federated neural network model training system 20 according to an embodiment of this application.

In some embodiments, referring to FIG. 14, FIG. 14 is an example schematic architecture diagram of a federated neural network model training system 20 according to an embodiment of this application. The function of the federated neural network model training system is implemented based on the server 300. In a case that a federated neural network model obtained through the federated neural network model training system is a recommendation model, the first participant is a development enterprise C of a first news APP, and the second participant is a development enterprise D of a second news APP. When a user A uses the first news APP through the terminal 100-1 and a user B uses the second news APP through the terminal 100-2, the terminal 100-1 collects first sample data and transmits the first sample data to the server 300 through the network 200, and the terminal 100-2 collects second sample data and transmits the second sample data to the server 300 through the network 200, and the server invokes a first bottom model of a training device 400-1 running on the first news APP to perform forward computation processing on the sample data to obtain an output vector of the first bottom model;

perform forward computation processing on the output vector of the first bottom model, a model parameter of an interaction layer, and an encrypted model parameter through an interaction layer running on the server 300, to obtain an output vector of the interaction layer, the model parameter of the interaction layer being from the first participant, and the encrypted model parameter being obtained by performing encryption processing on the model parameter of the interaction layer;

invoke a top model of a training device 400-2 running on the second news APP to perform forward computation processing on the output vector, to obtain an output vector of the federated neural network model (the recommendation model);

perform back propagation processing on the federated neural network model according to a loss result corresponding to the output vector of the federated neural network model, and update the model parameter of the interaction layer, a parameter of the first bottom model, and a parameter of the top model according to a back propagation processing result; and obtain a trained federated neural network model based on updated model parameters of the interaction layer, the first bottom model, and the top model, and distribute the trained federated neural network model (the recommendation model) to a recommendation server 500-1 of the first news APP and a recommendation server 500-2 of the second news APP, where the recommendation server of the first news APP provides a recommendation service to the user A, the recommendation server of the second news APP provides a recommendation service to the user B, two enterprises that develop the news APP jointly train the recommendation model (the federated neural network model) through respective training devices, the two enterprises that develop the news APP provide respective sample data for joint training and train the recommendation model based on data of two parties in a manner of federated learning without leaking respective data privacy, so that the recommendation model has a better recommendation accuracy than a model obtained based on unilateral data training.

In some example embodiments, the first participant is a training device of a bank E, the second participant is a training device of a bank F, and the training device of the bank E and the training device of the bank F jointly train a credit evaluation model of customers (the federated neural network model) based on sample data of two parties. In this way, the credit evaluation model is trained based on the data of the two parties in a manner of federated learning without leaking respective data privacy, so that the credit evaluation model may be trained with a better evaluation accuracy than a model obtained based on unilateral data training.

In some example embodiments, the first participant is a training device of a hospital G, the second participant is a training device of a hospital H, and the training device of the hospital G and the training device of the hospital H jointly train a lesion recognition model of customers (the federated neural network model) based on sample data of two parties. In this way, the lesion recognition model is trained based on the data of the two parties in a manner of federated learning without leaking respective data privacy, so that the lesion recognition model may be trained with a better recognition accuracy than a model obtained based on unilateral data training.

In some embodiments, the server 300 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 100-1 may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this embodiment of this application.

The training method for a federated neural network model provided in this embodiment of this application further involves the field of artificial intelligence technologies, so that the federated neural network model is trained through the artificial intelligence technologies, or information recommendation based on a trained federated neural network model is implemented through the artificial intelligence technologies. In this embodiment of this application, the method may be implemented through technologies such as machine learning and natural language processing in the artificial intelligence technology. Machine learning (ML) is a multi-field inter-disciplinary technology, and relates to a plurality of disciplines such as a probability theory, statistics, an approximation theory, a convex analysis, and an algorithm complexity theory. Machine learning specializes in studying how a computer simulates or implements a human learning behavior to obtain new knowledge or skills, and reorganize an existing knowledge structure, so as to keep improving performance of the computer. Machine learning is a core of the artificial intelligence, is a basic way to make the computer intelligent, and is applicable to various fields of artificial intelligence. Machine learning and deep learning generally include technologies such as an artificial neural network, a belief network, reinforcement learning, transfer learning, inductive learning, and learning from demonstrations. In this embodiment of this application, a network structure search request is responded to through a machine learning technology, to automatically search a target network structure and implement training and model optimization on a controller and a score model. Nature language processing (NLP) is an important direction in the fields of computer science and artificial intelligence, which studies various theories and methods that enable effective communication between humans and computers in natural language. Natural language processing is a science that integrates linguistics, computer science and mathematics. Therefore, research in this field involves natural languages, e.g., a language that people use daily, so it is closely related to the study of linguistics. The natural language processing technology generally includes technologies such as text processing, semantic understanding, machine translation, robot question and answer, and knowledge graph.

The training method for a federated neural network model provided in this embodiment of this application may also be implemented by using a cloud technology based on a cloud platform. For example, the server 300 may be a cloud server.

The cloud technology refers to a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing mode, and may form a resource pool, which is used as required, and is flexible and convenient. A cloud computing technology becomes an important support. A background service of a technical network system requires a large amount of computing and storage resources, such as for a video website, an image website, and more portal websites. As the Internet industry is highly developed and applied, each article may have an identifier in the future and needs to be transmitted to a background system for logical processing. Data at different levels is separately processed, and data in various industries requires strong system support, which can only be implemented by using cloud computing.

This embodiment of this application may also be implemented through a cloud storage technology in the cloud technology, for example, during training of the federated neural network model, the updated model parameter of the interaction layer may be stored in a cloud memory, or the trained federated neural network model may be stored in cloud memory. In this way, during subsequent use of the federated neural network model, a model may be directly obtained from the cloud memory for use and data processing, so that there is no need to retrain the federated neural network model, thereby improving the efficiency of data processing.

Cloud storage is a new concept that has been extended and developed on the concept of cloud computing. A distributed cloud storage system (hereinafter referred to as storage system) refers to a storage system that collect various different types of storage devices (where the storage device is also referred to as a storage node) in the network by using function such as a cluster application, a grid technology, and a distributed storage file system through application software or application interfaces, to externally provide data storage and a service access function to the outside. For example, a storage method for the storage system is to create logical volumes. A physical storage space is allocated to each logical volume when the logical volumes are created. The physical storage space may be formed by disks of a storage device or several storage devices. A client stores data on a certain logical volume, that is, stores the data in the file system. The file system splits data into many parts, where each part is an object, and the object not only include data but also includes additional information such as data identification (ID), and then the file system writes each object into a physical storage space of the logical volume and records storage location information of each object, so that if the client requests to access the data, the file system can allow, according to location storage information of each object, the client to access the data.

Figure 2:
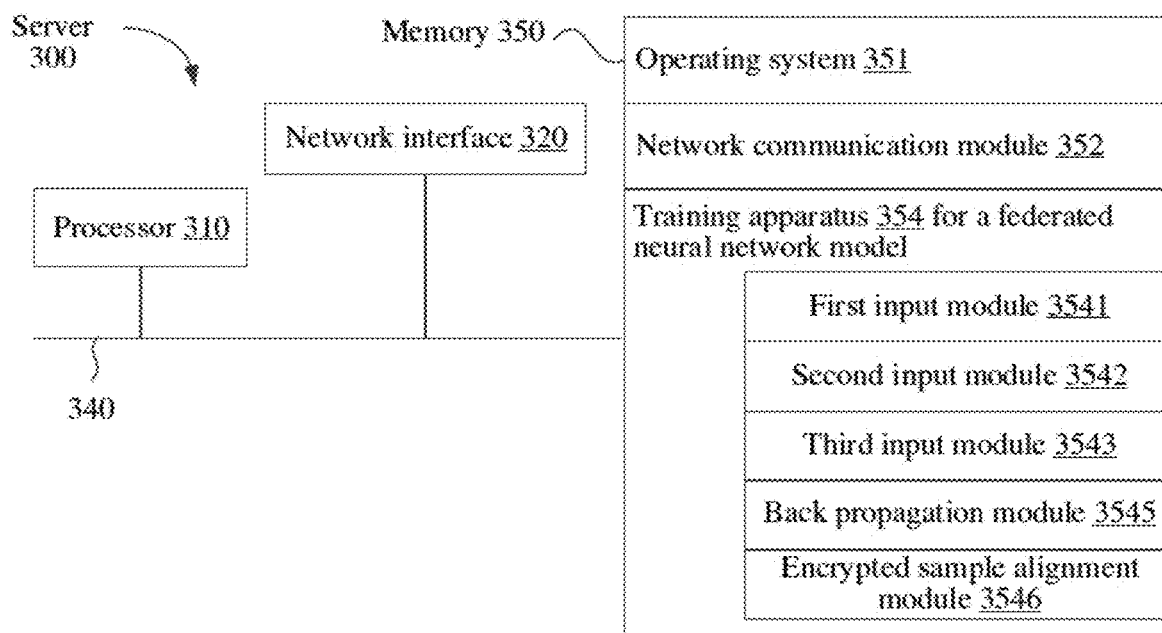
FIG. 2 is a schematic structural diagram of a server according to an embodiment of this application.

FIG. 2 is a schematic structural diagram of a server 300 according to an embodiment of this application. The server 300 shown in FIG. 2 includes: at least one processor 310, a memory 350, at least one network interface 320, and a user interface 330. Components in the server 300 are coupled together by using a bus system 340. It may be understood that the bus system 340 is configured to implement connection and communication between the components. In addition to a data bus, the bus system 340 further includes a power bus, a control bus, and a status signal bus. However, for ease of clear description, all types of buses are marked as the bus system 340 in FIG. 2.

The processor 310 may be an integrated circuit chip having a signal processing capability, for example, a general purpose processor, a digital signal processor (DSP), or another programmable logic device (PLD), discrete gate, transistor logical device, or discrete hardware component. The general-purpose processor may be a microprocessor, any conventional processor, or the like.

The memory 350 may be a removable memory, a non-removable memory, or a combination thereof. Exemplary hardware devices include a solid-state memory, a hard disk drive, an optical disc driver, or the like. The memory 350 optionally includes one or more storage devices physically away from the processor 310. The memory 350 includes a volatile memory or a non-volatile memory, or may include both a volatile memory and a non-volatile memory. The non-volatile memory may be a read-only memory (ROM), and the volatile memory may be a random-access memory (RAM). The memory 350 described in the embodiments of this application is to include any other suitable type of memories. In some embodiments, the memory 350 may store data to support various operations. Examples of the data include programs, modules, and data structures, or a subset or a superset thereof. The descriptions are made below by using examples.

An operating system 351 includes a system program configured to process various basic system services and perform a hardware-related task at various layers, for example, a framework layer, a core library layer, and a driver layer, and is configured to implement various basic services and process a hardware-related task.

A network communication module 352 is configured to reach another training device through one or more (wired or wireless) network interfaces 320. Exemplary network interfaces 320 include: Bluetooth, wireless compatible authentication (Wi-Fi), a universal serial bus (USB), and the like.

In some embodiments, the apparatus provided in this embodiment of this application may be implemented in a form of software. FIG. 2 shows a training apparatus 354 for a federated neural network model stored in the memory 350. The training apparatus 354 for a federated neural network model may be a training apparatus for a federated neural network model in the server 300, which may be software in a form such as a program and a plug-in, and includes the following software modules: a first input module 3541, a second input module 3542, a third input module 3543, a back propagation module 3545, and an encrypted sample alignment module 3546. Such modules are logical, and therefore may be randomly combined or further divided according to a function to be implemented. A function of each module is described below.

In some embodiments, the terminal or the server may implement the training method for a federated neural network model provided in this embodiment of this application by running a computer program. For example, the computer program may be a native program or a software module in an operating system; a native application (APP) needing to be installed in the operating system for running, for example, a news APP; a mini program, that can be run simply by downloading the program into a browser environment; or a mini program that can be embedded into any APP. Based on the above, the computer program may be an application, module, or plug-in in any form.

Figure 3:
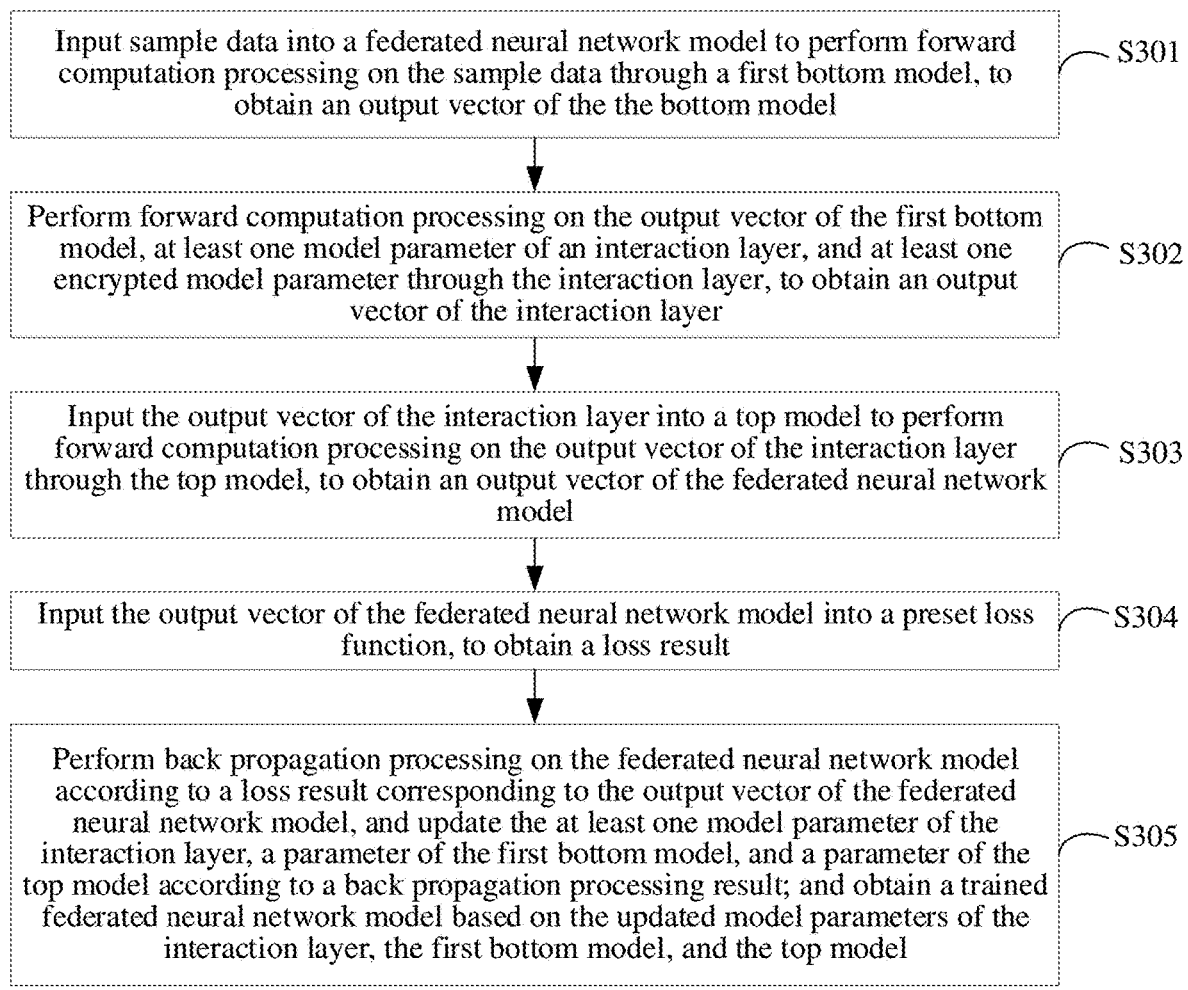
FIG. 3 is an example schematic flowchart of a training method for a federated neural network model according to an embodiment of this application.
Figure 4:
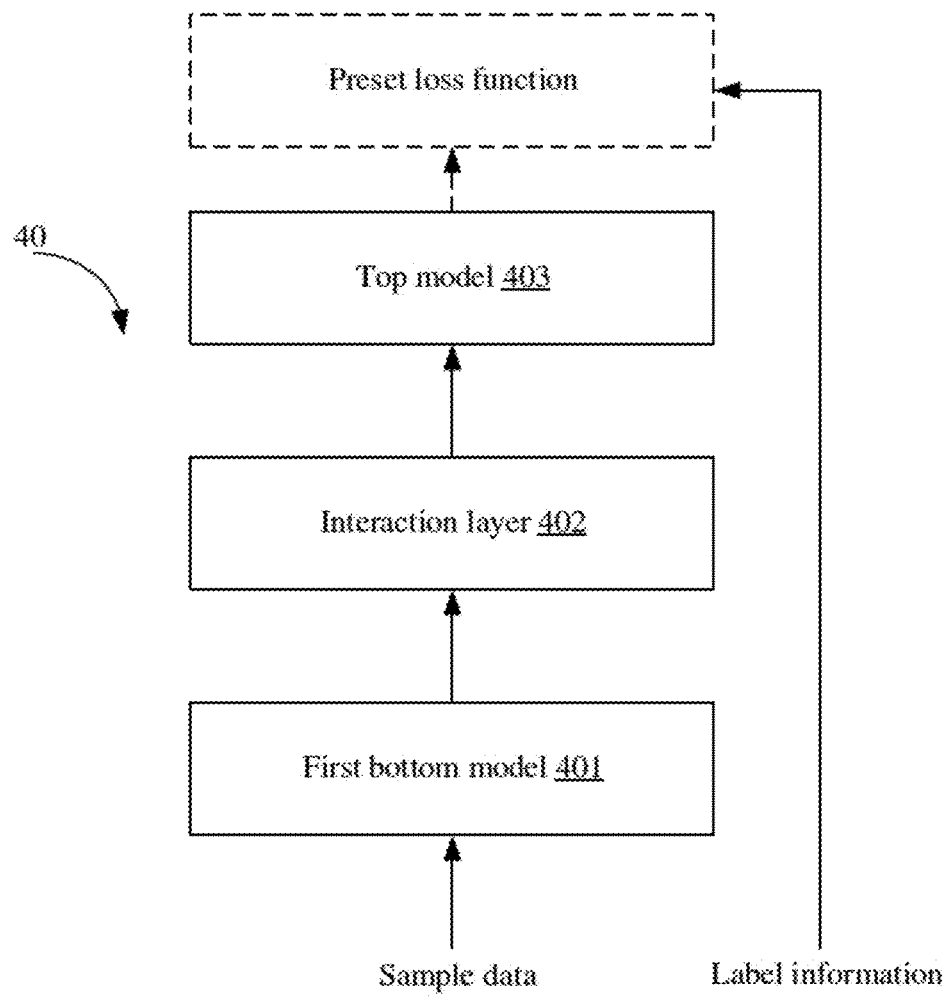
FIG. 4 is an example schematic structural diagram of a federated neural network model according to an embodiment of this application.

The training method for a federated neural network model provided in this embodiment of this application is described below with reference to exemplary applications and implementations of the server 300 provided in this embodiment of this application. FIG. 3 shows an example schematic flowchart of a training method for a federated neural network model according to an embodiment of this application, and FIG. 4 shows an example schematic structural diagram of a federated neural network model according to an embodiment of this application. As shown in FIG. 4, a federated neural network model 40 includes at least a first bottom model 401 of a first participant, an interaction layer 402, and a top model 403 of a second participant. Sample data is inputted into the first bottom model 401, and the second participant further includes label information for loss calculation. In the training method for a federated neural network model provided in this embodiment of this application, the first participant and the second participant are a training device of the first participant and a training device of the second participant. The training method for a federated neural network model is described below with reference to steps shown in FIG. 3 and the structure shown in FIG. 4.

Step S301: Input sample data into a federated neural network model to perform forward computation processing on the sample data through a first bottom model, to obtain an output vector of the bottom model.

The sample data may be data of any type, for example, the sample data may be data of a type such as an image, text, a video, or the like. In this embodiment of this application, a federated neural network model applicable to any field may be obtained through training, so that the type of the sample data may be selected based on a type of a to-be-trained federated neural network model. The sample data may source from the first participant and/or the second participant, that is, data of the first participant and/or the second participant is used as the sample data for model training.

The first bottom model is a network model of the first participant, and the first bottom model may be run on the training device of the first participant. The training device of the first participant is invoked through the server 300 in FIG. 1, so that the first bottom model is run to perform forward computation processing on the sample data, where the forward computation processing may be processing of any type. For example, the processing on the sample data by the first bottom model is data input processing in a case that the first bottom model is formed by only one input layer; and the processing on the sample data by the first bottom model is feature extraction processing on the sample data in a case that the first bottom model further includes a feature extraction layer. After processing the sample data, the first bottom model outputs the output vector of the first bottom model, where the output vector of the first bottom model is input data of the interaction layer.

Step S302: Perform forward computation processing on the output vector of the first bottom model, a model parameter of an interaction layer, and an encrypted model parameter through the interaction layer, to obtain an output vector of the interaction layer.

In an example, the model parameter of the interaction layer is obtained by performing linear operation-based encryption processing by a training device of the first participant on the model parameter of the interaction layer.

In an example, the interaction layer runs on the server 300 in FIG. 1, the training device of the first participant and the training device of the second participant to perform data processing, and respective data processing results interacts with each other, to obtain the output vector of the interaction layer. During interaction between the training device of the first participant and the training device of the second participant, a transformation operation is performed between feature vectors, and additionally, encryption processing and decryption processing are also performed. During the encryption, encryption processing may be performed in a RIAC-based encryption manner, or encryption processing is performed only in a case that the model parameter of the interaction layer is encrypted. The significant advantage of RIAC-based encryption is that a computation burden is small. Only linear transformation and modulo operations are performed, and modular exponentiation and modular inversion operations are not necessarily performed, so that the computation burden during the encryption is greatly reduced.

In this embodiment of this application, when the first bottom model performs processing to obtain the output vector of the first bottom model, the training device of the first participant further initializes the model parameter of the interaction layer to obtain an initial model parameter of the interaction layer. In addition, the training device of the first participant further generates a RIAC key and encrypts the model parameter of the interaction layer by using the RIAC key, to obtain an encrypted model parameter. Then, the output vector of the first bottom model, the initial model parameter of the interaction layer, and the encrypted model parameter that are obtained are used as input data to be respectively inputted into the interaction layer. In the interaction layer, data interaction is performed on the training device of the first participant and the training device of the second participant.

Step S303: Input the output vector of the interaction layer into a top model to perform forward computation processing on the output vector of the interaction layer through the top model, to obtain an output vector of the federated neural network model.

In an example, the top model may be a network model of the second participant, and the top model may be run on the training device of the second participant. The training device of the second participant may be invoked through the server 300 in FIG. 1, so that the top model is run to perform forward computation processing on the output vector of the interaction layer, for example, to run the top model to perform data output processing on the output vector of the interaction layer. The top model may be of any structure, and the structure of the top model may be determined according to a use scenario of the trained federated neural network model. After the output vector of the interaction layer is obtained, the output vector is used as input data of the top model to be inputted into the top model, and forward computation processing is performed on the output vector of the interaction layer through the top model, to obtain the output vector of the entire federated neural network model.

Step S304: Input the output vector of the federated neural network model into a preset loss function, to obtain a loss result.

In an example, a similarity or distance between the output vector of the federated neural network model and preset label information is calculated by using the preset loss function, and the loss result is determined according to the similarity and the distance, where the preset label information is a true value manually calibrated.

When the similarity between the output vector of the federated neural network model and the label information is greater than a first similarity threshold or the distance is less than a first distance threshold, it indicates that a difference between an output result of the federated neural network model and the true value is relatively small, the result is closer to the true value, and subsequent model training may be stopped. When the similarity between the output vector and the label information is less than a second similarity threshold or the distance is greater than a second distance threshold, it indicates that the difference between the output result of the federated neural network model and the true value is relatively large, and the model needs to be further trained. In this case, the model parameter of the interaction layer may be updated based on a certain learning rate, and step S301 and the steps that follows are iterated to continue to perform training, where the first similarity threshold is greater than or equal to the second similarity threshold, and the first distance threshold is less than or equal to the second distance threshold.

Step S305: Perform back propagation processing on the federated neural network model according to a loss result corresponding to the output vector of the federated neural network model, and update the model parameter of the interaction layer, a parameter of the first bottom model, and a parameter of the top model according to a back propagation processing result; and obtain a trained federated neural network model based on updated model parameters of the interaction layer, the first bottom model, and the top model.

In an example, the process of back propagation processing is as follows: updating the model parameter of the interaction layer, the model parameter of the first bottom model, and the model parameter of the top model according to the loss result to a certain extent, to obtain an updated model parameter of the interaction layer, an updated model parameter of the first bottom model, and an updated model parameter of the top model, and performing step 301 to step 305 based on a federated neural network model having new model parameters until a training stop condition is met, where the training stop condition includes: the trained federated neural network model has converged, times of training reach a maximum quantity of times of iteration that is allowed, a training time reaches a maximum model training time, and the like.

In the training method for a federated neural network model provided in this embodiment of this application, forward computation processing is performed on the output vector of the first bottom model, the model parameter of the interaction layer, and the encrypted model parameter through the interaction layer in a case that the federated neural network model is trained, to obtain an output vector of the interaction layer, where the model parameter of the interaction layer is obtained by performing linear operation-based encryption processing by a training device of the first participant on the model parameter of the interaction layer;

forward computation processing is performed on the output vector of the interaction layer through the top model, to obtain an output vector of the federated neural network model; back propagation processing is performed on the federated neural network model according to a loss result corresponding to the output vector of the federated neural network model, and the model parameter of the interaction layer, a parameter of the first bottom model, and a parameter of the top model are updated according to a back propagation processing result; and a trained federated neural network model is obtained based on updated model parameters of the interaction layer, the first bottom model, and the top model. In this way, since the model parameter of the interaction layer is encrypted based a RIAC encryption manner, during model training of the obtained encrypted model parameter, the computation complexity may be greatly reduced, the computation amount may be reduced, and the computation time may be shortened.

In some embodiments, the federated neural network model may further include a second bottom model (a third model) of the second participant, that is, the second participant may not include a bottom model or may include a bottom model, and the second participant may also include label information or may not include label information, where the label information refers to the label information used for loss calculation performed on the output vector of the federated neural network model.

Figure 5:
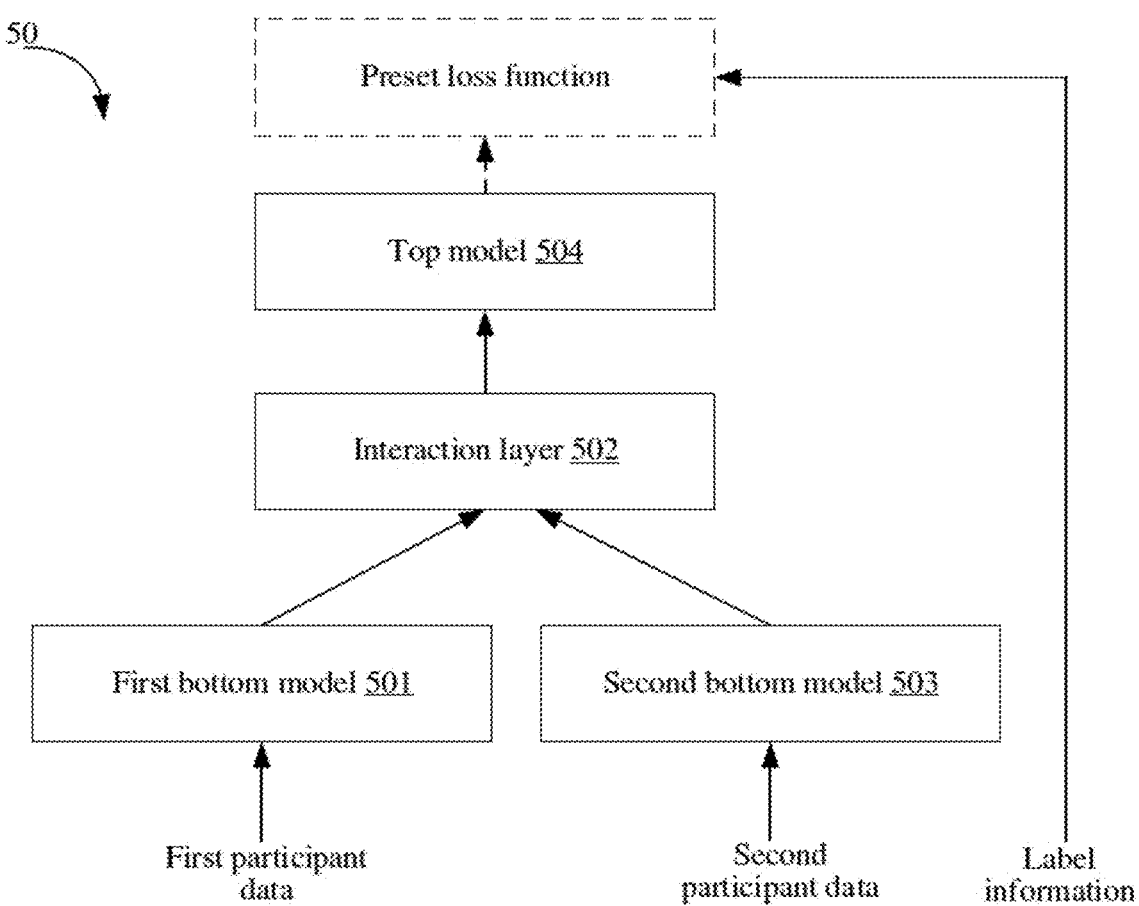
FIG. 5 is an example schematic structural diagram of a federated neural network model according to an embodiment of this application.

FIG. 5 is an example schematic structural diagram of a federated neural network model according to an embodiment of this application. As shown in FIG. 5, a federated neural network model 50 includes at least a first bottom model 501 of a first participant, an interaction layer 502, a second bottom model 503 of a second participant, and a top model 504 of the second participant. The first bottom model 501 runs on a training device of the first participant, and the second bottom model 503 runs on a training device of the second participant. The server 300 in FIG. 1 may invoke the first bottom model 501 and the second bottom model 503, and the interaction layer runs on the server 300 in FIG. 1, so that the training device of the first participant and the training device of the second participant are invoked through the interaction layer to perform data processing, and respective data processing results can interact, to obtain an output vector of the interaction layer. The first participant and the second participant both include a bottom model, so that sample data may be inputted by two participants, and the sample data may include first participant data and second participant data.

Figure 6:
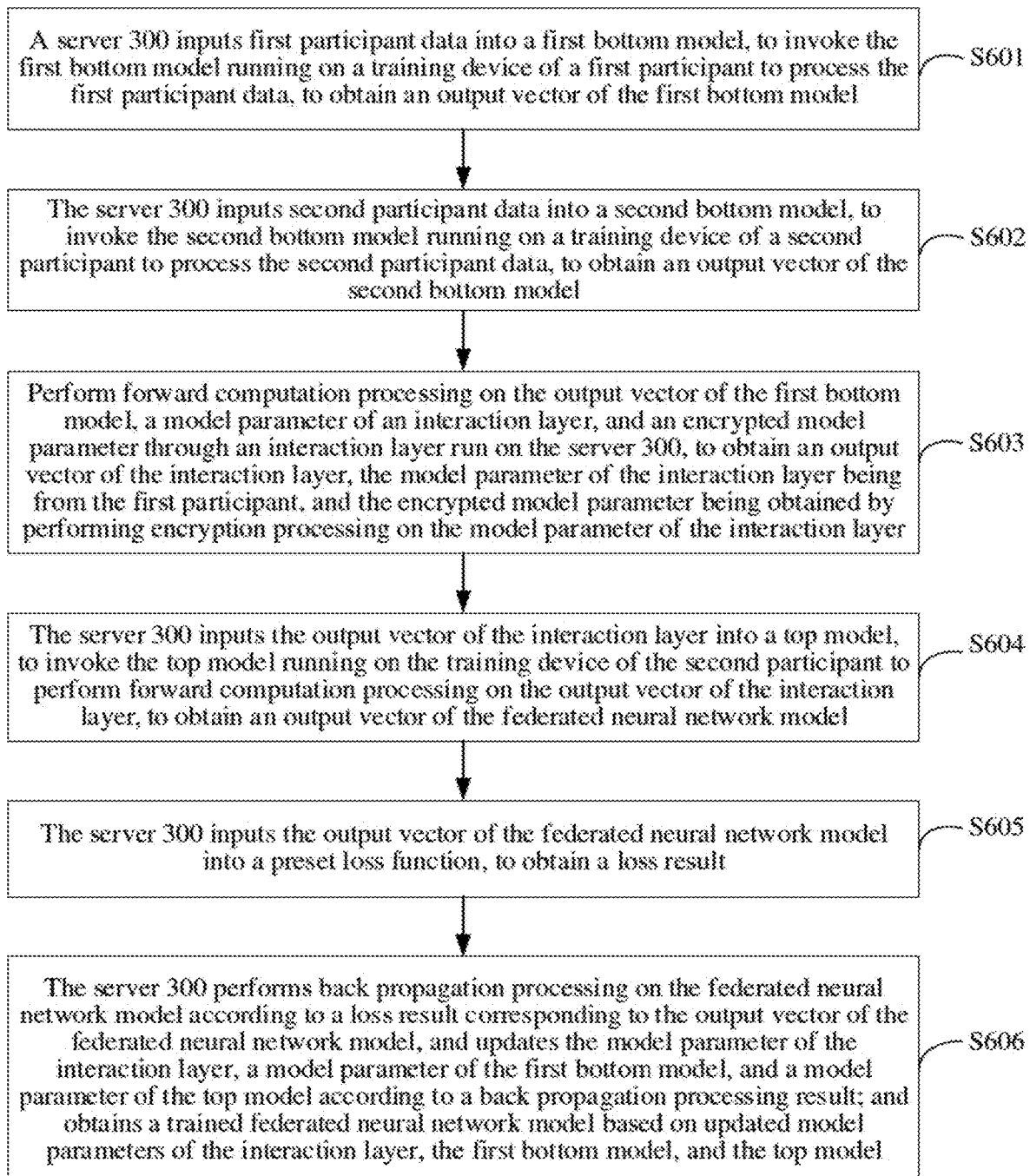
FIG. 6 is an example schematic flowchart of a training method for a federated neural network model according to an embodiment of this application.

FIG. 6 is an example schematic flowchart of a training method for a federated neural network model according to an embodiment of this application. As shown in FIG. 6, the method includes the following steps:

Step S601: A server 300 inputs first participant data into a first bottom model, to invoke the first bottom model running on a training device of a first participant to process the first participant data, to obtain an output vector of the first bottom model.

Step S602: The server 300 inputs second participant data into a second bottom model, to invoke the second bottom model running on a training device of a second participant to process the second participant data, to obtain an output vector of the second bottom model.

In this embodiment of this application, the first participant data and the second participant data are separately obtained, the first participant data is inputted into the first bottom model of the first participant for processing, and the second participant data is inputted into the second bottom model of the second participant for processing, so that the output vector of the first bottom model and the output vector of the second bottom model are correspondingly obtained, to perform subsequent interaction processing by the interaction layer.

The first participant data and the second participant data may be data for the same user or object. For example, the first participant is a bank, and the second participant is an e-commerce entity, and correspondingly, the first participant data may be bank data (such as deposit, wage, and the like) for a user A, and the second participant data may be e-commerce data (purchased commodities, purchase amounts, and the like) for the user A. In this embodiment of this application, model training is performed with reference to different types of data of different participants for the same object, so that the user can be accurately analyzed and depicted, thereby training and obtaining a more accurate federated neural network model for information recommendation to the user.

Step S603: Perform forward computation processing on the output vector of the first bottom model, the model parameter of the interaction layer, and the encrypted model parameter through the interaction layer running on the server 300, to obtain an output vector of the interaction layer, the encrypted model parameter of the interaction layer is obtained by performing linear operation-based encryption processing by a training device of the first participant on the model parameter of the interaction layer.

In an example, since the federated neural network model further includes the second bottom model, the input data of the interaction layer includes not only the output vector of the first bottom model, but also the output vector of the second bottom model.

Step S604: The server 300 inputs the output vector of the interaction layer into a top model, to invoke the top model running on the training device of the second participant to perform forward computation processing on the output vector of the interaction layer, to obtain an output vector of the federated neural network model.

Step S605: The server 300 inputs the output vector of the federated neural network model into a preset loss function, to obtain a loss result.

Step S606: The server 300 performs back propagation processing on the federated neural network model according to a loss result corresponding to the output vector of the federated neural network model, and updates the model parameter of the interaction layer, a parameter of the first bottom model, and a parameter of the top model according to a back propagation processing result; and obtains a trained federated neural network model based on updated model parameters of the interaction layer, the first bottom model, and the top model.

Step S604 to step S606 are the same as step S303 to step S305 described above. Details are not described again in this embodiment of this application.

Figure 7:
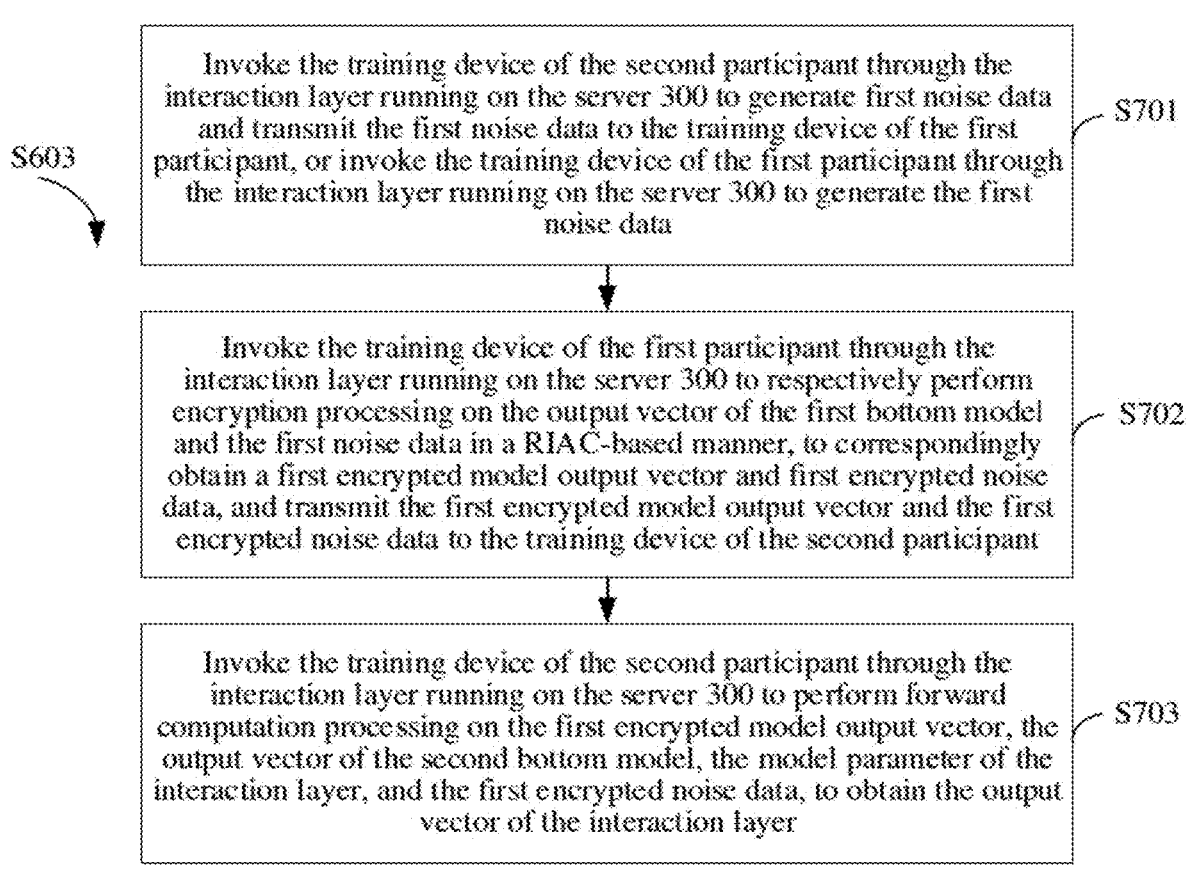
FIG. 7 is an example schematic flowchart of a training method for a federated neural network model according to an embodiment of this application.

In some embodiments, the process of performing forward computation processing on the output vector of the first bottom model, the model parameter of the interaction layer, and the encrypted model parameter through the interaction layer to obtain the output vector of the interaction layer described in step S603 involves a series of processes of data transformation and encryption processing, and a process of determining the output vector by the interaction layer is described below with reference to an example schematic flowchart of a training method for a federated neural network model shown in FIG. 7. Step S603 includes the following steps:

Step S701: Invoke the training device of the second participant through the interaction layer running on the server 300 to generate first noise data and transmit the first noise data to the training device of the first participant, or invoke the training device of the first participant through the interaction layer running on the server 300 to generate the first noise data.

In an example, the first noise data may be generated by generating a random number as noise data or forming a mask to mask a part of data.

Step S702: Invoke the training device of the first participant through the interaction layer running on the server 300 to respectively perform encryption processing on the output vector of the first bottom model and the first noise data in a RIAC-based manner, to correspondingly obtain a first encrypted model output vector and first encrypted noise data, and transmit the first encrypted model output vector and the first encrypted noise data to the training device of the second participant.

Step S703: Invoke the training device of the second participant through the interaction layer running on the server 300 to perform forward computation processing on the first encrypted model output vector, the output vector of the second bottom model, the model parameter of the interaction layer, and the first encrypted noise data, to obtain the output vector of the interaction layer.

In an example, the model parameter of the interaction layer includes a first model parameter corresponding to the first participant and a second model parameter corresponding to the second participant. Correspondingly, step S703 may be implemented by performing the following steps:

Step S7031: Invoke the training device of the second participant through the interaction layer running on the server 300 to generate second noise data, and obtain a sum of noise of the training device of the first participant during back propagation. Step S7032: Invoke the training device of the second participant through the interaction layer running on the server 300 to determine a first transformation vector of the first participant according to the first model parameter, the output vector of the first bottom model, the sum of noise, the second noise data, and the first noise data. The process of determining the first transformation vector may be implemented by performing the following steps:

Step S71: Invoke the training device of the second participant through the interaction layer running on the server 300 to determine a first ciphertext according to the first model parameter, the first encrypted model parameter obtained by encrypting the output vector of the first bottom model, the second noise data, and the first encrypted noise data, and transmit the first ciphertext to the training device of the first participant.

Step S72: Invoke the training device of the first participant through the interaction layer running on the server 300 to decrypt the first ciphertext, to obtain a first plaintext.

Step S73: Invoke the training device of the first participant through the interaction layer running on the server 300 to determine a second plaintext according to the first plaintext, the output vector of the first bottom model, and the sum of noise, and transmit the second plaintext to the training device of the second participant.

Step S74: Invoke the training device of second participant through the interaction layer running on the server 300 to perform error elimination on the second plaintext, to obtain the first transformation vector.

Step S7033: Invoke the training device of the second participant through the interaction layer running on the server 300 to determine a product of the second model parameter and the output vector of the second bottom model as a second transformation vector of the second participant.

Step S7034: Invoke the training device of the second participant through the interaction layer running on the server 300 to perform vector combination processing on the first transformation vector and the second transformation vector, to obtain a combined vector. The vector combination process may be implemented in any one of the following two manners: Manner 1: Perform vector splicing processing on the first transformation vector and the second transformation vector, to obtain the combined vector. Manner 2: Perform weighted average combination processing on the first transformation vector and the second transformation vector, to obtain the combined vector.

Step S7035: Invoke the training device of second participant through the interaction layer running on the server 300 to perform activation processing on the combined vector, to obtain the output vector of the interaction layer.

In this embodiment of this application, an activation function used for activation processing may be any one of the following: a relu function, a sigmoid function, a tanh( )function, a swish function, a mish function, a softmax function, or the like.

In some embodiments, the back propagation process described in step S606 further involves a series of processes of data transformation and encryption processing, and the back propagation process in step S606 is described below with reference to an example schematic flowchart of a training method for a federated neural network model shown in FIG. 8. Step S606 includes the following steps:

Step S801: Invoke the training device of the first participant through the interaction layer running on the server 300 to generate third noise data, and invoke the training device of the second participant through the interaction layer running on the server 300 to generate fourth noise data.

In an example, the third noise data may also be generated by generating a random number as noise data or forming a mask to mask a part of data.

Step S802: The server 300 determines a first gradient value of the loss result relative to a first transformation vector.

Step S803: The server 300 obtains a preset learning rate for the federated neural network model.

As an important hyperparameter in supervised learning and deep learning, the learning rate determines whether and when a target function can converge to a local minimum value. An appropriate learning rate enables the target function to converge to the local minimum within an appropriate/reasonable period of time. In this embodiment of this application, the learning rate is a preset value. In a case that the learning rate is set excessively small, the convergence process may be very slow, and in a case that the learning rate is set excessively large, the gradient value may oscillate back and forth near the minimum value, and the model even cannot converge. Therefore, it is necessary to set an appropriate learning rate. In this embodiment of this application, the learning rate may be set to 0.01, as an example.

Step S804: The server 300 determines a first model update parameter for the first participant according to the first model parameter, the learning rate, the first gradient value, the third noise data, the fourth noise data, and the first noise data.

Step S805: The server 300 updates the first model parameter by using the first model update parameter.

Figure 8:
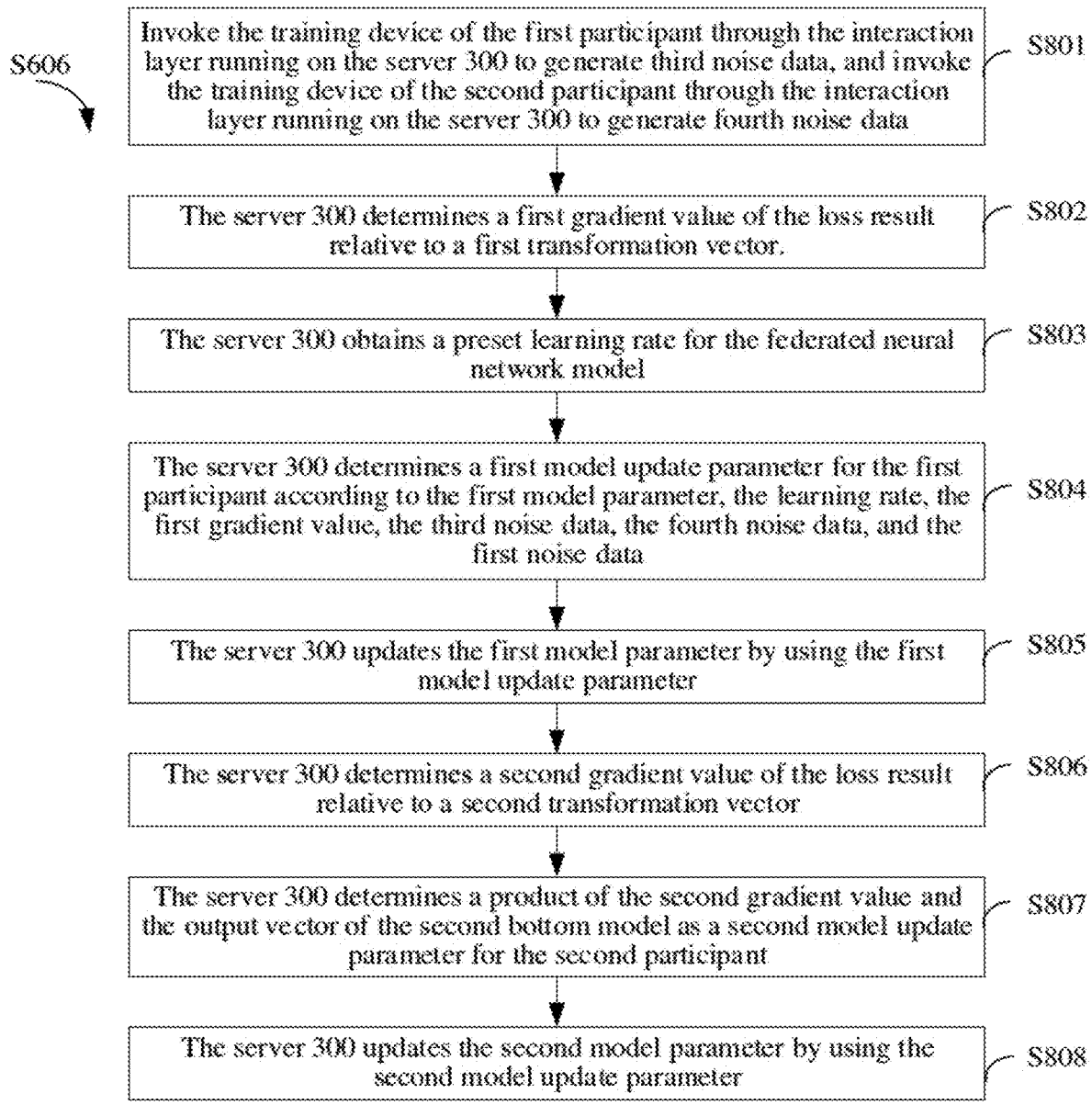
FIG. 8 is an example schematic flowchart of a training method for a federated neural network model according to an embodiment of this application.

Still referring to FIG. 8, the back propagation process in step S606 further includes updating the second model parameter, which includes the following steps:

Step S806: The server 300 determines a second gradient value of the loss result relative to a second transformation vector.

Step S807: The server 300 determines a product of the second gradient value and the output vector of the second bottom model as a second model update parameter for the second participant.

Step S808: The server 300 updates the second model parameter by using the second model update parameter.

In some embodiments, before the sample data is inputted into the federated neural network model, step S10 is performed in which the server 300 performs encrypted sample alignment processing on the first participant data and the second participant data, to obtain alignment sample data between the first participant data and the second participant data.

Figure 9:
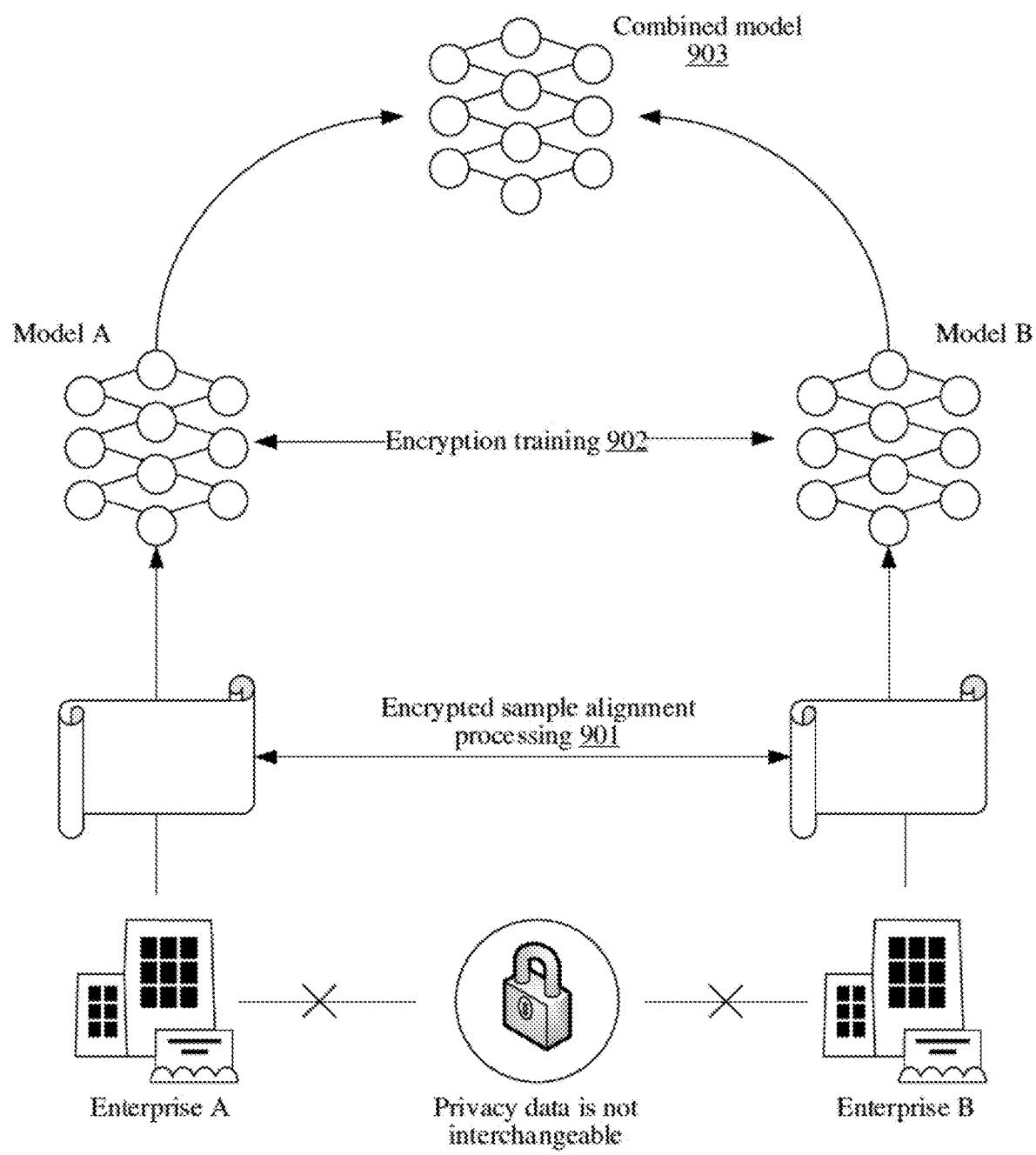
FIG. 9 is a framework diagram of a training method for a federated neural network model according to an embodiment of this application.

FIG. 9 is a framework diagram of a training method for a federated neural network model according to an embodiment of this application. As shown in FIG. 9, a first participant (which may be an enterprise A) has first participant data, a second participant (which may be an enterprise B) has second participant data. Encrypted sample alignment processing 901 is first performed on data. Privacy data of the first participant and the second participant are not interchangeable. Encryption training 902 is performed after encrypted sample alignment processing 901 is performed, where a model A is a network model of the first participant, and a model B is a network model of the second participant, so that a final combined model 903, that is, a trained federated neural network model is obtained after model training is performed by using the training method according to any one of the foregoing embodiments of this application.

The method provided in this embodiment of this application is applicable to training of a vertical federated neural network model, where in vertical federated learning corresponding to the vertical federated neural network model, in a case that more users overlap and less user features overlap in two datasets, the datasets are stitched vertically (that is, according to a feature dimension), and a part of data in which users are the same and user features are not exactly the same is retrieved for training. Such a method is referred to as vertical federated learning. For example, there are two different institutions, one is a bank in a certain place and the other is an e-commerce company in the same place. User groups of the institutions are likely to include the majority of the residents in such a place, and therefore users of the institutions have more intersection. However, since the bank records user's revenues and expenditures and credit rating, and the e-commerce company saves user's browsing and purchasing history, user features of the institutions have less intersection. Vertical federated learning is implemented to aggregate such different features in an encrypted state, to enhance the capability of the model.

Figure 10:
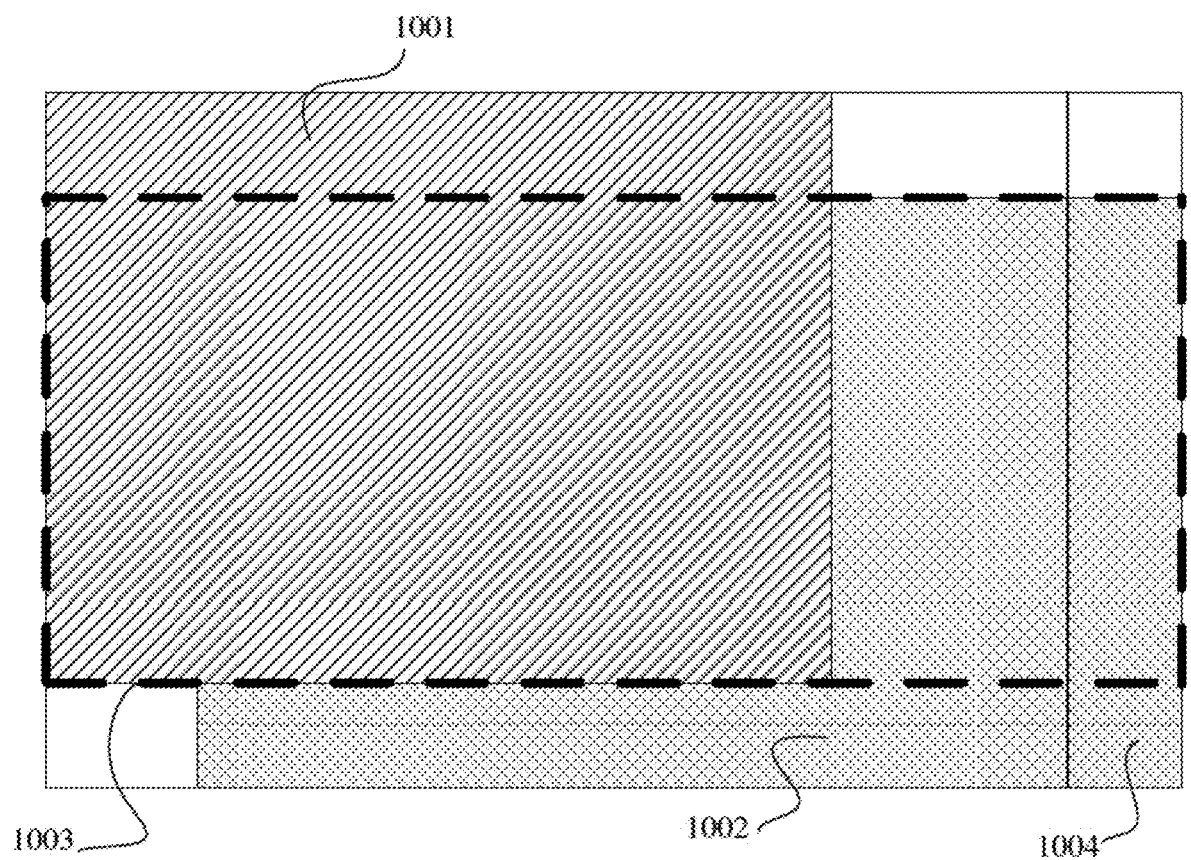
FIG. 10 is a schematic diagram of encrypted sample alignment processing for vertical federated learning according to an embodiment of this application.

FIG. 10 is a schematic diagram of encrypted sample alignment processing for vertical federated learning according to an embodiment of this application. As shown in FIG. 10, after encrypted sample alignment processing is performed on first participant data 1001 from a first participant A and second participant data 1002 from a second participant B, alignment sample data 1003 between the first participant data 1001 and the second participant data 1002 is extracted, where the alignment sample data 1003 include feature data of the same sample (for example, the same user) between the first participant data 1001 and the second participant data 1002. In this embodiment of this application, the second participant B may further have label information 1004. Therefore, the alignment sample data 1003 further includes a part of the label information. In this embodiment of this application, after the alignment sample data is extracted, the alignment sample data is inputted into the federated neural network model for model training.

Since a plurality of data encryption and decryption processes are involved during training of the federated neural network model, in this embodiment of this application, each encryption process may be implemented in a RIAC-based encryption manner, or at least one encryption process may be implemented in the RIAC-based encryption manner.

An exemplary application of this embodiment of this application in an actual application scenario is described below.

In some embodiments, the federated neural network model may include a recommendation model, and the function of the federated neural network model training system is implemented based on the server. In a case that a federated neural network model obtained through the federated neural network model training system is a recommendation model, when a user A uses a first news APP through a terminal and a user B uses a second news APP through a terminal, the terminal collects first sample data and transmits the first sample data to the server through the network, the terminal collects second sample data and transmits the second sample data to the server through the network; the server invokes a training device running on the first news APP and a training device running on the second news APP to perform collaborative learning to obtain a trained federated neural network model, and distributes the trained federated neural network model to a recommendation server of the first news APP and a recommendation server of the second news APP; and the recommendation server of the first news APP provides recommendation services to the user A, and the recommendation server of the second news APP provides recommendation services to the user B.

An embodiment of this application provides a training method for a federated neural network model, which supports a two-party vertical federated neural network model (that is, a deep learning model) and is applicable to model training and model inference services for a federal learning task. In particular, common vertical federated linear regression and logistic regression models are special vertical federated neural network models, that is, neural network models with only one layer of neurons.

The training method for a federated neural network model provided in this embodiment of this application is applicable to model training and model inference as the federal learning task, which reduces the computation complexity and the computation time, reduces communication overheads, improves availability of a federated learning system platform, thereby further improving the effect of a federated learning model. A main product form may be providing federal learning services to the outside in public or private clouds in the form of a federal learning platform.

Figure 11:
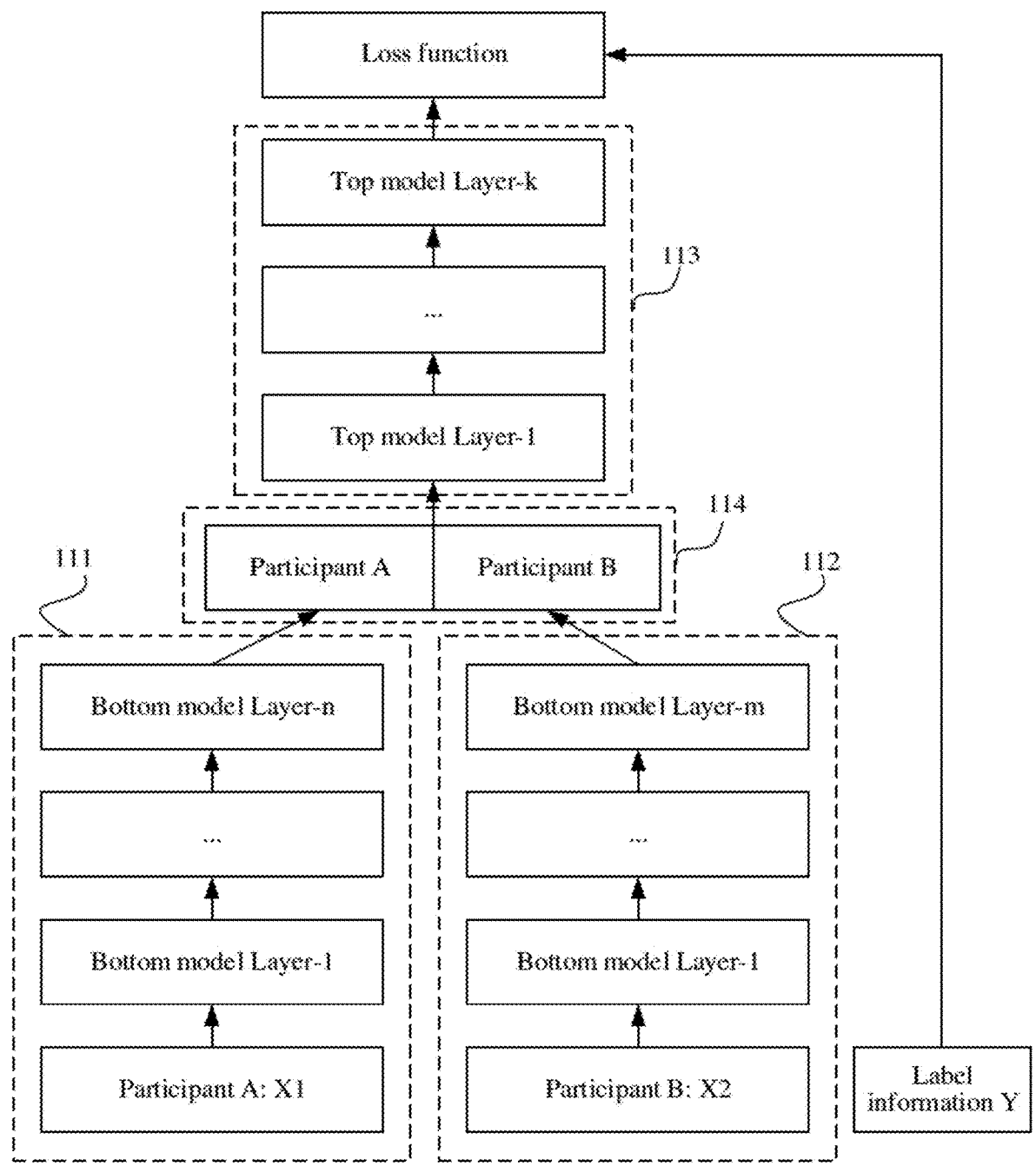
FIG. 11 is a schematic diagram of two-party vertical federated neural network model training and inference processes according to an embodiment of this application.

The technical solutions provided in this embodiment of this application is applicable to model training and inference services for the two-party vertical federated neural network model (that is, the deep learning model). FIG. 11 is a schematic diagram of two-party vertical federated neural network model training and inference processes according to an embodiment of this application, in which a participant A (that is, a first participant) and a participant B (that is, a second participant) cooperate to perform model training and inference services for the vertical federated neural network model. The participant A includes a first data feature X1 and a bottom neural network model 111; and the participant B includes a second data feature X2, label information Y, a bottom model 112, and a top model 113. Further, the participant B further includes a model parameter $W_A$ and $W_B$ of an interaction layer 114.

Two-party encrypted sample alignment: assuming that the participant A and the participant B respectively includes first datasets $D_A$ and $D_B$, Two participants of the vertical federated learning need to align included training data, select an intersection of sample IDs of the included training data, that is, calculate an intersection of the same sample IDs in the datasets $D_A$ and $D_B$ without leaking sample ID information of a non-intersection. Such a step is a two-party security sample alignment, which may be implemented, for example, based on a Freedman protocol-based algorithm or an RSA-based algorithm.

For federated model training, neural network model training is generally performed by using a stochastic gradient descent (SGD) algorithm in practice. In the SGD-based model training method, a plurality of times of gradient descent iterations need to be performed, and each iteration may be divided into two stages: first, forward compute a model output and residual; and second, back propagate and calculate a gradient of a loss function of a model to a model parameter, and update the model parameter by using the calculated gradient. The iteration is repeatedly performed until a stop condition (for example, the model converges, or an allowed maximum quantity of times of iteration is reached, or a maximum model training time is reached) is met.

Figure 12:
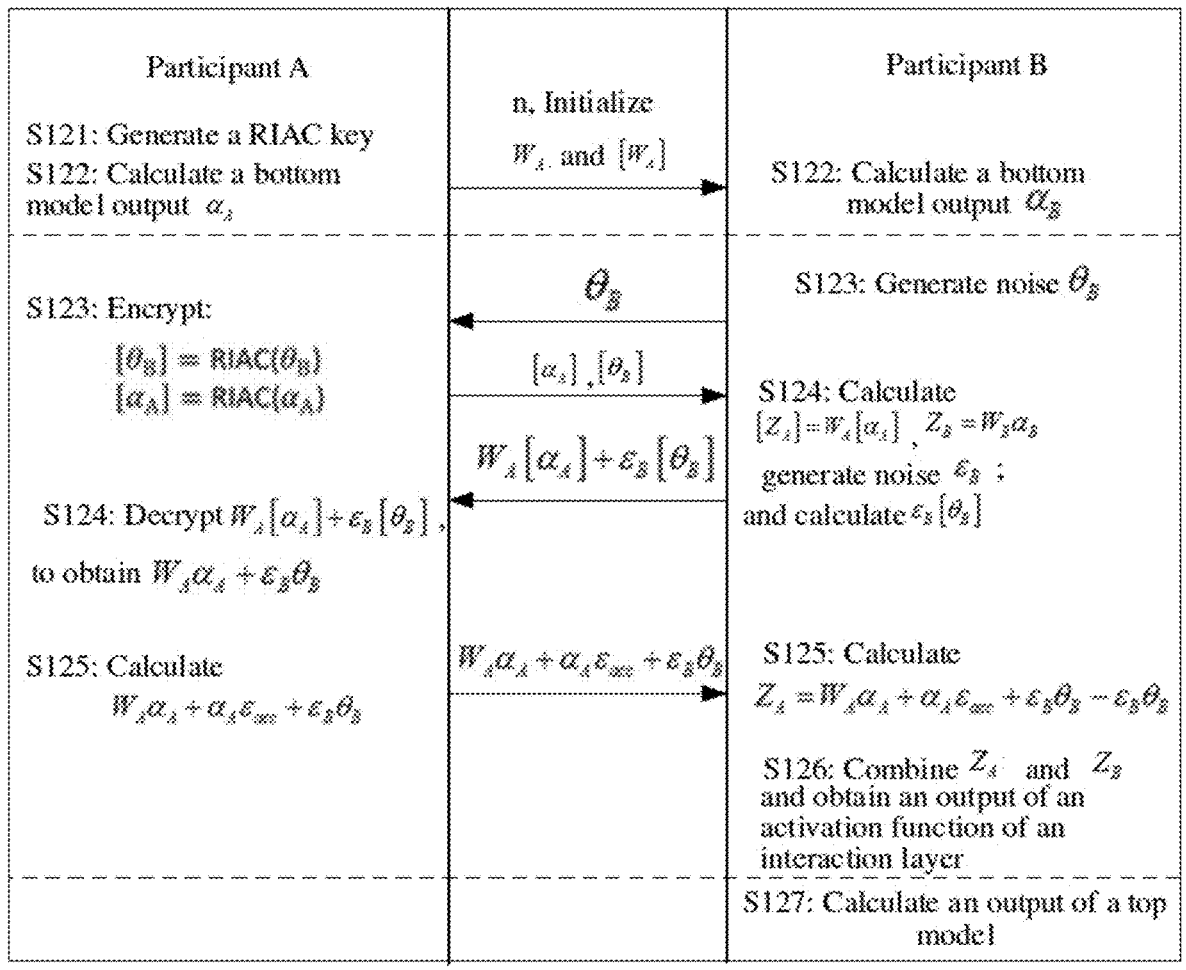
FIG. 12 is a flowchart of forward computation for two-party vertical federated neural network model training based on a randomized iterative affine cipher (RIAC) according to an embodiment of this application.

As shown in FIG. 12, FIG. 12 is a flowchart of forward computation for two-party vertical federated neural network model training RIAC-based according to an embodiment of this application.

In step S121, the participant A generates a RIAC key (a, b, g, h, d, n) and transmits a modulus n of a RIAC algorithm to the participant B. All operations in a ciphertext space and operations involving a ciphertext are operations on the modulus n, which is not repeated below. To meet linear operations in the ciphertext space, b=0 is required herein. The security of the algorithm is derived from a random number used in the encryption process. During model parameter initialization, the participant A needs to generate an initial value of a model parameter $W_A$ of the interaction layer, and obtain $[W_A]$ by using a RIAC. The participant A needs to transmit the initial model parameters $W_A$ and $[W_A]$ of the interaction layer to the participant B. $W_A$ is a matrix including a plurality of elements. In another example implementation, in a case that $W_A$ is encrypted in a RIAC-based manner, different random numbers may also be generated for each element, to enhance the security of the RIAC and prevent the participant B from inferring the RIAC key.

In step S122, the participant A and the participant B respectively calculate outputs of the bottom neural network models, which is respectively recorded as $\alpha_A$ and $\alpha_B$.

In step S123, the participant B generates noise (that is, a random number) $\zeta_B$ and transmits the noise to the participant A. $\theta_B$ cannot be zero. After obtaining the noise $\theta_B$, the participant A encrypts $\alpha_A$ to $[\alpha_A]$ by using the RIAC, encrypts $\theta_B$ to $[\theta_B]$, and transmits $[\alpha_A]$ and $[\theta_B]$ to the participant B.

In another example implementation, the noise $\theta_B$ may also be generated by the participant A, so that the participant B is not required to transmit the noise $\theta_B$ to the participant A. If the noise $\theta_B$ is generated by the participant A, the participant A may cheat, for example, set $\theta_B$ to zero. Therefore, it is securer to generate the noise $\theta_B$ by the participant B.

In step S124, the participant B calculates $[Z_A]=W_A[\alpha_A]$, $Z_B=W_B\alpha_B$, generates the noise $\epsilon_B$, and transmits a ciphertext $W_A[\alpha_A]+\epsilon_B[\theta_B]$ to the participant A. $\epsilon_B$ cannot be zero.

After receiving $W_A[\alpha_A]+\epsilon_B[\theta_B]$, the participant A decrypts $W_A[\alpha_A]+\epsilon_B[\theta_B]$ to obtain a plaintext $W_A\alpha_A+\epsilon_B\theta_B$.

In step S125, the participant A calculates $W_A\alpha_A+\alpha_A\epsilon_{acc}+\epsilon_B\theta_B$ and transmits $W_A\alpha_A+\alpha_A\epsilon_{acc}+\epsilon_B\theta_B$ to the participant B. $\epsilon_{acc}$ is a sum of noise (refer to the back propagation process) generated by the participant A during back propagation.

After receiving $W_A\alpha_A+\alpha_A\epsilon_{acc}+\epsilon_B\theta_B$, the participant B calculates $Z_A=W_A\alpha_A\alpha_A\epsilon_{acc}+\epsilon_B\theta_B-\epsilon_B\theta_B$ to obtain $Z_A=W_A\alpha_A+\alpha_A^{true}\alpha_A$ on which error elimination is performed, $W_A^{true}=W_A+\epsilon_{acc}$.

In step S126, the participant B combines $Z_A$ and $Z_B$ in a manner to obtain z, for example, performs vector splicing and combination on $Z_A$ and $Z_B$, or performs weighted average combination on $Z_A$ and $Z_B$. This is not limited herein. Then, the participant B obtains an output g(z) of the activation function of the interaction layer.

In this embodiment of this application, an activation function may be any one of the following: a relu function, a sigmoid function, a tanh( ) function, a swish function, a mish function, a softmax function, or the like.

In step S127, the participant B continues to perform forward computation processing on g(z) through a top neural network model, obtains an output $\overline{Y}$ of the entire vertical federated neural network model, and completes the forward computation process of the model.

As shown in FIG. 13, FIG. 13 is a flowchart of back propagation for two-party vertical federated neural network model training based on an RIAC according to an embodiment of this application.

In step S131, the participant B calculates a loss function according to a federated model output $\overline{Y}$ and label information Y; and the participant B calculates a gradient of the model loss function to a model parameter of a top model of the participant B, and updates the model parameter of the top model.

The participant A encrypts a cumulative noise $\epsilon_{acc}$ to $[\epsilon_{acc}]$ by using the RIAC; and generates noise $\epsilon_A$ and encrypts $$\frac{\varepsilon_A}{\eta} \text{ to } \left[\frac{\varepsilon_A}{\eta}\right].$$

$\eta$ is a learning ng rate, for example, $\eta=0.01$. $\epsilon_A$ cannot be zero.

In step S132, the participant B calculates a gradient $\delta_{act\_A}$ of the model loss function to $Z_A$; the participant B generates noise $\varphi_B$; and calculates $\delta_{act\_A}[\alpha_A]+\varphi_B[\theta_B]$ and transmits a ciphertext $\delta_{act\_A}[\alpha_A]+\varphi_B[\theta_B]$ to the participant A.

After receiving $\delta_{act\_A}[\alpha_A]+\varphi_B[\theta_B]$, the participant A decrypts $\delta_{act\_A}[\alpha_A]+\varphi_B[\theta_B]$ to obtain $\delta_{act\_A}\alpha_A+\varphi_B\theta_B$, the participant A further calculates $$u_A = \delta_{act\_A}\alpha_A + \frac{\varepsilon_A}{\eta} + \varphi_B\theta_B$$

and transmits $u_A$, $[\epsilon_{acc}]$, and $$\left[\frac{\varepsilon_A}{\eta}\right]$$

to the participant B. The participant A updates the cumulative noise, where the cumulative noise may be updated by assigning $\epsilon^{acc}+\epsilon_A$ to $\epsilon_{acc}$, $\varphi_B$ cannot be zero.

In another possible implementation, in such a step, the participant B may regenerate new noise $\theta_B$ and transmits the noise to the participant A (or the participant A generates new noise $\theta_B$); and then the participant A perform obtains $[\theta_B]$ by encrypting through the RIAC, and returns $[\theta_B]$ to the participant B. Such an implementation is referred to as noise refresh, that is, different noise $\theta_B$ are used during forward computation and back propagation. $\theta_B$ cannot be zero.

In step S133, the participant B updates a model parameter of the interaction layer in the form of a plaintext:

$$W_A \leftarrow W_A - \eta\left(\delta_{act\_A}\alpha_A + \frac{\epsilon_A}{\eta} + \varphi_B\theta_B - \varphi_B\theta_B\right),$$

where "←" represents that assigning a value on the right to $W_A$ on the left to obtain $W_A = W_A^{true} - \epsilon_{acc}$; and the participant B updates a model parameter of the interaction layer in the form of a ciphertext:

$$[W_A] \leftarrow [W_A] - \eta\left(\delta_{act\_A}[\alpha_A] + \left[\frac{\epsilon_A}{\eta}\right] + \varphi_B[\theta_B] - \varphi_B[\theta_B]\right),$$

to obtain $[W_A]=[W_A^{true}]-[\epsilon_{acc}]$.

During model parameter initialization, the participant A needs to generate an initial value of a model parameter $W_A$ of the interaction layer, and obtain $[W_A]$ by using a RIAC. The participant A needs to transmit initial $W_A$ and $[W_A]$ to the participant B.

In step S134, the participan B calculates $[\delta_{bottom\_A}]=\delta_{act\_A}([W_A]+[\epsilon_{acc}])$, and transmits a ciphertext $[\delta_{bottom\_A}]$ to the participant A. After receiving $[\delta_{bottom\_A}]$, the participant A decrypts $[\delta_{bottom\_A}]$ to obtain $\delta_{bottom\_A}$.

In step S135, the participant B calculates a gradient $\delta_{act\_B}$ of the model loss function to $Z_B$; and the participant B updates the model parameter $W_B$ of the interaction layer by using $\delta_{act\_B}\alpha_B$.

In step S136, the participant B calculates $\delta_{bottom\_B}=\delta_{act\_B}W_B$.

In step S137, after using $\delta_{bottom\_A}$, the participant A continues to back propagate and update the model parameter of the bottom model; and after using $\delta_{bottom\_B}$, the participant B continues to back propagate and update the model parameter of the bottom model.

The model parameter $W_A$ of the interaction layer is always a true parameter minus a cumulative error $\epsilon_{acc}$, that is, $W_A = W_A^{true} - \epsilon_{acc}$, but a correct model output can be always obtained through forward computation, for example, $Z_A = W_A\alpha_A + \alpha_A\epsilon_{acc} = \alpha_A(W_A+\epsilon_{acc}) = W_A^{true}\alpha_A$.

Federated model inference service: The stage of model inference is to perform model inference (which is also known as model prediction) for data other than training data, for example, model inference needs to be performed during testing of model performance and application of model inference services. The model inference only needs to perform the foregoing stage of forward computation. Therefore, this embodiment of this application provides a RIAC-based privacy protection protocol, as shown in FIG. 12, which is also applicable to inference services for the vertical federated neural network model.

To reduce the computation amount and achieve a better training effect, generally only a mini-batch of data is processed in each SGD iteration, for example, each mini-batch of data includes 128 training samples. In this case, the participant A and the participant B needs to coordinate the selection of training samples in batches and mini batches, so that the training samples in the mini batches selected by two participants in each iteration are aligned.

The RIAC is an affine cipher in a special form. A process of encrypting the affine cipher is operated based on affine transformation (which is also known as linear transformation). For example, a plaintext m is inputted, a ciphertext c is outputted, $c=(a*m+b)\%n$, or $c=(a*(m+b))\%n$, where an encryption key is (a, b, n). *represents a multiplication, % represents a modulus operation, n being a modulus. To ensure the feasibility of an encryption algorithm (for example, ensure the existence of a decryption key and a one-to-one correspondence between the ciphertext and the plaintext), a and n is required to be interdependent, that is, a maximum common denominator of a and n is 1. The decryption key for the affine cipher is $(a^{-1}, b, n)$, where $a^{-1}$ is an inversed modular of a, that is, $(a*a^{-1})\%n=1$. Generally, n is taken as a very large prime number.

The affine cipher has excellent homology properties, including an addition on the ciphertext, a multiplication on the plaintext and the ciphertext (which is commonly known as scalar multiplication, requiring that b=0). The homology property means that an operation result in a ciphertext space may be directly converted into an operation result in the plaintext space. For example, ciphertext addition homology refers to: $dec(enc(m_1)+enc(m_2))=m_1+m_2$; and for example, scalar multiplication homology refers to: $dec(m_1*enc(m_2))=m_1*m_2$.

An iterative affine cipher refers to repeatedly performing affine encryption (repeatedly performing affine transformation), for example, $c_1=(a_1*m+b_1)\%n_1$, $c_2=(a_2*c_1+b_2)\%n_2$, $c_3=(a_3*c_2+b_3)\%n_3$, . . . Regardless of how many times it is repeated, whether it is affine transformation (which is commonly referred to as linear transformation) or the affine cipher, addition and multiplication homology properties are still met (where it is to be pointed out: the scalar multiplication homology requires that b=0).

The randomized iterative affine cipher (RIAC) adds noise to the iterative affine cipher to enhance the security of the affine cipher.

For example, a plaintext addition process may include generating a random number r, calculates $m_1=(r*g)\%n$, $m_2=(m+r*h)\%n$, which requires that $h=(d*g)\%n$, and (g, h) is a part of the encryption key. Then iterative affine encryption is respectively performed on $m_1$ and $m_2$. After iterative affine decryption is performed, a de-noise process includes: $(m_2-d*m_1)\%n$, and therefore, d is a part of the decryption key.

The significant advantage of RIAC-based encryption is that a computation burden is small. Only linear transformation and modulo operations are performed, and modular exponentiation and modular inversion operations are unnecessarily. In addition, compared with a Paillier algorithm, a ciphertext of the RIAC may be shorter, because the operation is performed by taking the modulus n rather than taking modulus $n^2$ in the Paillier algorithm.

In the training method for a federated neural network model provided in this embodiment of this application, the RIAC-based privacy protection protocol is used during training of the vertical federated neural network model, which can significantly reduce the computation amount of encryption and decryption. This is because only linear transformation and modulo operations are performed, and modular exponentiation and modular inversion operations are not necessarily performed. The method provided in this embodiment of this application adopts the RIAC-based privacy protection protocol, the ciphertext of the RIAC is shorter than using the Paillier algorithm or similar algorithm, which can reduce communication traffic of federated learning. This is because RIAC encryption is performed by taking the modulus n rather than taking modulus $n^2$ in the Paillier algorithm.

The technical solution provided in this embodiment of this application supports any form of vertical federated neural network model. In particular, common vertical federated linear regression and logistic regression models are special neural network models, that is, neural network models with only one layer of neurons.

A training apparatus 354 for a federated neural network model provided in this embodiment of this application being implemented as an exemplary structure of a software module is described below. In some embodiments, as shown in FIG. 2, the software module of the training apparatus 354 for a federated neural network model stored in the memory 350 may be a training apparatus for a federated neural network model in the server 300, the federated neural network model including at least a first bottom model of a first participant, an interaction layer, and a top model of a second participant. The apparatus includes: a first input module 3541, configured to perform forward computation processing on the sample data through a first bottom model, to obtain an output vector of the first bottom model; and a second input module 3542, configured to perform forward computation processing on the output vector of the first bottom model, a model parameter of an interaction layer, and an encrypted model parameter through the interaction layer, to obtain an output vector of the interaction layer, the model parameter of the interaction layer is obtained by performing linear operation-based encryption processing by a training device of the first participant on the model parameter of the interaction layer; a third input module 3543, configured to perform forward computation processing on the output vector of the interaction layer through the top model, to obtain an output vector of the federated neural network model; and a back propagation module 3545, configured to perform back propagation processing on the federated neural network model according to a loss result corresponding to the output vector of the federated neural network model, and the model parameter of the interaction layer, a parameter of the first bottom model, and a parameter of the top model are updated according to a back propagation processing result; and obtain a trained federated neural network model based on updated model parameters of the interaction layer, the first bottom model, and the top model.

In some embodiments, the federated neural network model further includes the second bottom model of the second participant; and the sample data includes first participant data and second participant data. The first input module 3541 is further configured to: process the first participant data through the first bottom model to obtain an output vector of the first bottom model, and process the second participant data through the second bottom model to obtain an output vector of the second bottom model; and a second input module 3542 is further configured to: perform forward computation processing on the output vector of the first bottom model, the output vector of the second bottom model, a model parameter of an interaction layer, and an encrypted model parameter through the interaction layer, to obtain an output vector of the interaction layer.

In some embodiments, the second input module 3542 is further configured to: invoke the training device of the first participant through the interaction layer to perform encryption processing on the output vector of the first bottom model to obtain first encrypted model output vector, and perform encryption processing on first noise data to obtain first encrypted noise data, the first noise data being from the training device of the second participant or from the training device of the first participant; invoke the training device of the first participant to transmit the first encrypted model output vector and the first encrypted noise data to the training device of the second participant; and invoke the training device of the second participant to perform forward computation processing on the first encrypted model output vector, the output vector of the second bottom model, the model parameter of the interaction layer, and the first encrypted noise data, to obtain the output vector of the interaction layer.

In some embodiments, the model parameter of the interaction layer includes a first model parameter corresponding to the first participant and a second model parameter corresponding to the second participant. the second input module 3542 is further configured to: invoke the training device of the second participant to generate second noise data, and obtain a sum of noise of the training device of the first participant during back propagation; determine a first transformation vector of the first participant according to the first model parameter, the output vector of the first bottom model, the sum of noise, the second noise data, and the first noise data; determine a product of the second model parameter and the output vector of the second bottom model as a second transformation vector of the second participant; perform vector combination processing on the first transformation vector and the second transformation vector, to obtain a combined vector; and perform activation processing on the combined vector, to obtain the output vector of the interaction layer.

In some embodiments, the second input module 3542 is further configured to: invoke the training device of the second participant through the interaction layer to perform processing on the first model parameter, a first encrypted model parameter, the second noise data, and the first encrypted noise data to obtain a first ciphertext, and transmit the first ciphertext to the training device of the first participant, the first encrypted model parameter being obtained by encrypting the output vector of the first bottom model; invoke the training device of the second participant to receive a second plaintext returned by the training device of the first participant, the second plaintext being obtained by processing a first plaintext, the output vector of the first bottom model, and the sum of noise by the training device of the first participant, and the first plaintext being obtained by decrypting the first ciphertext by the training device of the first participant; and invoke the training device of the second participant to perform error elimination processing on the second plaintext, to obtain the first transformation vector.

In some embodiments, the second input module 3542 is further configured to perform vector splicing processing on the first transformation vector and the second transformation vector, to obtain the combined vector; or perform weighted average combination processing on the first transformation vector and the second transformation vector, to obtain the combined vector.

In some embodiments, the back propagation module 3545 is further configured to determine a first gradient value of the loss result relative to a first transformation vector; obtain a preset learning rate for the federated neural network model; determine a first model update parameter for the first participant according to the first model parameter, the learning rate, the first gradient value, third noise data from the first participant, fourth noise data from the second participant, and first noise data; update the first model parameter by using the first model update parameter; determine a second gradient value of the loss result relative to a second transformation vector; determine a product of the second gradient value and the output vector of the second bottom model as a second model update parameter for the second participant; and update the second model parameter by using the second model update parameter.

In some embodiments, the apparatus further includes an encrypted sample alignment module 3546, configured to perform encrypted sample alignment processing on the first participant data and the second participant data, to obtain alignment sample data between the first participant data and the second participant data; and replace the sample data with the alignment sample data.

In some embodiments, during training of the federated neural network model, each encryption process is implemented in a randomized iterative affine cipher (RIAC) encryption manner.

In this disclosure above, a unit or a module may be hardware such as a combination of electronic circuitries, firmware, or software such as computer instructions. The unit and the module may also be any combination of hardware, firmware, and software. In some implementation, a unit may include at least one module.

Descriptions of the apparatus provided in this embodiment of this application are similar to the descriptions of the method embodiments. The apparatus embodiments have beneficial effects similar to those of the method embodiments and thus are not repeatedly described. Refer to descriptions in the method embodiments of this application for technical details undisclosed in the apparatus embodiments of this application.

An embodiment of this application provides a computer program product or a computer program. The computer program product or the computer program includes computer instructions, and the computer instructions are stored in a computer-readable storage medium. The processor of the training device reads the computer instructions from the computer-readable storage medium, and the processor executes the computer instructions, to cause the training device to perform the method provided in this embodiment of this application.

An embodiment of this application provides a storage medium storing executable instructions. When the executable instructions are executed by a processor, the processor is caused to perform the training method for a federated neural network model provided in this embodiment of this application, for example, the training method for a federated neural network model shown in FIG. 3.

In some embodiments, the computer storage medium may be a computer-readable storage medium, for example, a memory such as a ferromagnetic random access memory (FRAM), a read only memory (ROM), a programmable read-only memory (PROM), an erasable programmable read-only memory (EPROM), an electrically erasable programmable read-only memory (EEPROM), a flash memory (Flash Memory), a magnetic storage, an optic disc, or a compact disc read-only memory (CD-ROM), or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts). In an example, the executable instructions may be deployed to be executed on a training device, or deployed to be executed on a plurality of training devices at the same location, or deployed to be executed on a plurality of training devices that are distributed in a plurality of locations and interconnected by using a communication network.

An embodiment of this application provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the training method for a federated neural network model provided in this embodiment of this application.

The federated neural network model provided in this embodiment of this application includes at least a first bottom model of a first participant, an interaction layer, and a top model of a second participant. In the training method for a federated neural network model provided in this embodiment of this application, sample data is first inputted into the federated neural network model, to process the sample data through the first bottom model, to obtain an output vector of the bottom model; then, the output vector of the bottom model, the model parameter of the interaction layer generated by the first participant, and an encrypted model parameter obtained by encrypting the model parameter of the interaction layer based a RIAC encryption manner are respectively inputted into the interaction layer, to respectively perform vector transform processing and activation processing on the output vector of the bottom layer, the model parameter of the interaction layer, and the encrypted model parameter through the interaction layer, to obtain an output vector of the interaction layer; input the output vector into a top model to perform forward computation processing on the output vector through the top model, to obtain an output vector of the federated neural network model; input the output vector into a preset loss function, to obtain a loss result; and back propagate the federated neural network model according to a loss result to update the model parameter of the interaction layer, to complete training of the federated neural network model. In this way, since the model parameter of the interaction layer is encrypted based a RIAC encryption manner, during model training of the obtained encrypted model parameter, the computation complexity may be greatly reduced, the computation burden may be reduced, and the computation time may be shortened.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A training method for a federated neural network model, the federated neural network model comprising a first model corresponding to a first training participant, a second model corresponding to a second training participant, and an interaction layer, the method being performed by a training device and comprising:
    performing forward computation processing of sample data through the first model, to obtain an output vector of the first model;
    performing forward computation processing through the interaction layer of the output vector of the first model, at least one model parameter of the interaction layer, and at least one encrypted model parameter to obtain an output vector of the interaction layer, the at least one encrypted model parameter of the interaction layer being obtained by performing linear operation-based encryption processing by the first training participant on the model parameter of the interaction layer;
    performing forward computation processing on the output vector of the interaction layer through the second model, to obtain an output vector of the federated neural network model;
    performing back propagation processing on the federated neural network model according to a loss result corresponding to the output vector of the federated neural network model, and updating the at least one model parameter of the interaction layer, at least one model parameter of the first model, and at least one model parameter of the second model according to a back propagation processing result; and
    generating a trained federated neural network model based on the updated model parameters of the interaction layer, the first model, and the second model.

2. The method according to claim 1, wherein the first model comprises a model running on the training device of the first training participant and is configured to process the sample data, and the second model comprises a model running on a training device of the second training participant and configured to process the output vector of the interaction layer.

3. The method according to claim 1, wherein:
    the federated neural network model further comprises a third model running on a training device of the second training participant;
    the sample data comprises first training participant data and second training participant data;
    performing forward computation processing on the sample data through the first model, to obtain he output vector of the first model comprises:
        processing the first training participant data through the first model to obtain the output vector of the first model, and processing the second training participant data through the third model to obtain an output vector of the third model; and
    performing forward computation processing on the output vector of the first model, the at least one model parameter of the interaction layer, and the at least one encrypted model parameter through the interaction layer, to obtain the output vector of the interaction layer comprises:
        performing forward computation processing on the output vector of the first model, the output vector of the third model, the at least one model parameter of the interaction layer, and the at least one encrypted model parameter through the interaction layer, to obtain the output vector of the interaction layer.

4. The method according to claim 3, wherein performing forward computation processing on the output vector of the first model, the output vector of the third model, the at least one model parameter of the interaction layer, and the at least one encrypted model parameter through the interaction layer, to obtain the output vector of the interaction layer comprises:
    invoking the training device of the first training participant through the interaction layer to perform encryption processing on the output vector of the first model to obtain first encrypted model output vector, and perform encryption processing on first noise data to obtain first encrypted noise data, the first noise data being from the training device of the second training participant or from the training device of the first training participant;
    invoking the training device of the first training participant through the interaction layer to transmit the first encrypted model output vector and the first encrypted noise data to the training device of the second training participant; and
    invoking the training device of the second training participant through the interaction layer to perform forward computation processing on the first encrypted model output vector, the output vector of the third model, the at least one model parameter of the interaction layer, and the first encrypted noise data, to obtain the output vector of the interaction layer.

5. The method according to claim 4, wherein:
    the at least one model parameter of the interaction layer comprises a first model parameter corresponding to the first training participant and a second model parameter corresponding to the second training participant; and
    invoking the training device of the second training participant through the interaction layer to perform forward computation processing on the first encrypted model output vector, the output vector of the third model, the at least one model parameter of the interaction layer, and the first encrypted noise data, to obtain the output vector of the interaction layer comprises:
        invoking the training device of the second training participant through the interaction layer to generate second noise data, and obtaining a sum of noise of the training device of the first training participant during back propagation;
        invoking the training device of the second training participant through the interaction layer to perform the following operations: determining a first transformation vector of the first training participant according to the first model parameter, the output vector of the first model, the sum of noise, the second noise data, and the first noise data;
        invoking the training device of the second training participant through the interaction layer to determine a product of the second model parameter and the output vector of the third model as a second transformation vector of the second training participant;
        invoking the training device of the second training participant through the interaction layer to perform vector combination processing on the first transformation vector and the second transformation vector, to obtain a combined vector; and
        invoking the training device of the second training participant through the interaction layer to perform activation processing on the combined vector, to obtain the output vector of the interaction layer.

6. The method according to claim 5, wherein determining the first transformation vector of the first training participant according to the first model parameter, the output vector of the first model, the sum of noise, the second noise data, and the first noise data comprises:
invoking the training device of the second training participant through the interaction layer to perform processing on the first model parameter, a first encrypted model parameter, the second noise data, and the first encrypted noise data to obtain a first ciphertext, and transmit the first ciphertext to the training device of the first training participant, the first encrypted model parameter being obtained by encrypting the output vector of the first model;
invoking the training device of the second training participant through the interaction layer to receive a second plaintext returned by the training device of the first training participant, the second plaintext being obtained by processing a first plaintext, the output vector of the first model, and the sum of noise by the training device of the first training participant, and the first plaintext being obtained by decrypting the first ciphertext by the training device of the first training participant; and
invoking the training device of the second training participant through the interaction layer to perform error elimination processing on the second plaintext, to obtain the first transformation vector.

7. The method according to claim 5, wherein invoking the training device of the second training participant through the interaction layer to perform vector combination processing on the first transformation vector and the second transformation vector to obtain a combined vector comprises:
invoking the training device of the second training participant through the interaction layer to perform vector splicing processing on the first transformation vector and the second transformation vector, to obtain the combined vector; or
invoking the training device of the second training participant through the interaction layer to perform weighted average combination processing on the first transformation vector and the second transformation vector, to obtain the combined vector.

8. The method according to claim 1, wherein:
the at least one model parameter of the interaction layer comprises a first model parameter corresponding to the first training participant and a second model parameter corresponding to the second training participant; and
performing back propagation processing on the federated neural network model according to the loss result corresponding to the output vector of the federated neural network model, and updating the at least one model parameter of the interaction layer according to the back propagation processing result comprises:
determining a first gradient value of the loss result relative to a first transformation vector;
obtaining a preset learning rate for the federated neural network model;
determining a first model update parameter for the first training participant according to the first model parameter, the preset learning rate, the first gradient value, third noise data from the first training participant, fourth noise data from the second training participant, and first noise data;
updating the first model parameter by using the first model update parameter;
determining a second gradient value of the loss result relative to a second transformation vector;

determining a product of the second gradient value and an output vector of a third model as a second model update parameter for the second training participant; and
updating the second model parameter by using the second model update parameter.

9. The method according to claim 3, wherein before performing forward computation processing on sample data through the first model, to obtain an output vector of the first model, and the method further comprises:
performing encrypted sample alignment processing on the first training participant data and the second training participant data, to obtain alignment sample data between the first training participant data and the second training participant data; and
replacing the sample data with the alignment sample data.

10. The method according to claim 1, wherein during training of the federated neural network model, each encryption process is implemented in a randomized iterative affine cipher (RIAC) encryption manner.

11. A training apparatus for a federated neural network model, the federated neural network model comprising a first model corresponding to a first training participant, a second model corresponding to a second training participant, and an interaction layer, the training apparatus comprising a memory for storing computer instructions and a processor for executing the computer instructions to:
perform forward computation processing of sample data through the first model, to obtain an output vector of the first model;
perform forward computation processing through the interaction layer of the output vector of the first model, at least one model parameter of the interaction layer, and at least one encrypted model parameter to obtain an output vector of the interaction layer, the at least one encrypted model parameter of the interaction layer being obtained by performing linear operation-based encryption processing by the first training participant on the model parameter of the interaction layer;
perform forward computation processing on the output vector of the interaction layer through the second model, to obtain an output vector of the federated neural network model;
perform back propagation processing on the federated neural network model according to a loss result corresponding to the output vector of the federated neural network model, and update the at least one model parameter of the interaction layer, at least one parameter of the first model, and at least one parameter of the second model according to a back propagation processing result; and
generate a trained federated neural network model based on the updated model parameters of the interaction layer, the first model, and the second model.

12. The training apparatus according to claim 11, wherein the first model comprises a model running on the training device of the first training participant and is configured to process the sample data, and the second model comprises a model running on a training device of the second training participant and configured to process the output vector of the interaction layer.

13. The training apparatus according to claim 11, wherein:
the federated neural network model further comprises a third model running on a training device of the second training participant;
the sample data comprises first training participant data and second training participant data;

to perform forward computation processing on the sample data through the first model, to obtain he output vector of the first model comprises:
process the first training participant data through the first model to obtain the output vector of the first model, and processing the second training participant data through the third model to obtain an output vector of the third model; and
to perform forward computation processing on the output vector of the first model, the at least one model parameter of the interaction layer, and the at least one encrypted model parameter through the interaction layer, to obtain the output vector of the interaction layer comprises:
perform forward computation processing on the output vector of the first model, the output vector of the third model, the at least one model parameter of the interaction layer, and the at least one encrypted model parameter through the interaction layer, to obtain the output vector of the interaction layer.

14. The training apparatus according to claim 13, wherein to perform forward computation processing on the output vector of the first model, the output vector of the third model, the at least one model parameter of the interaction layer, and the at least one encrypted model parameter through the interaction layer, to obtain the output vector of the interaction layer comprises:
invoke the training device of the first training participant through the interaction layer to perform encryption processing on the output vector of the first model to obtain first encrypted model output vector, and perform encryption processing on first noise data to obtain first encrypted noise data, the first noise data being from the training device of the second training participant or from the training device of the first training participant;
invoke the training device of the first training participant through the interaction layer to transmit the first encrypted model output vector and the first encrypted noise data to the training device of the second training participant; and
invoke the training device of the second training participant through the interaction layer to perform forward computation processing on the first encrypted model output vector, the output vector of the third model, the at least one model parameter of the interaction layer, and the first encrypted noise data, to obtain the output vector of the interaction layer.

15. The training apparatus according to claim 14, wherein:
the at least one model parameter of the interaction layer comprises a first model parameter corresponding to the first training participant and a second model parameter corresponding to the second training participant; and
to invoke the training device of the second training participant through the interaction layer to perform forward computation processing on the first encrypted model output vector, the output vector of the third model, the at least one model parameter of the interaction layer, and the first encrypted noise data, to obtain the output vector of the interaction layer comprises:
invoke the training device of the second training participant through the interaction layer to generate second noise data, and obtaining a sum of noise of the training device of the first training participant during back propagation;
invoke the training device of the second training participant through the interaction layer to perform the following operations: determining a first transformation vector of the first training participant according to the first model parameter, the output vector of the first model, the sum of noise, the second noise data, and the first noise data;
invoke the training device of the second training participant through the interaction layer to determine a product of the second model parameter and the output vector of the third model as a second transformation vector of the second training participant;
invoke the training device of the second training participant through the interaction layer to perform vector combination processing on the first transformation vector and the second transformation vector, to obtain a combined vector; and
invoke the training device of the second training participant through the interaction layer to perform activation processing on the combined vector, to obtain the output vector of the interaction layer.

16. The training apparatus according to claim 15, wherein to determine the first transformation vector of the first training participant according to the first model parameter, the output vector of the first model, the sum of noise, the second noise data, and the first noise data comprises:
invoke the training device of the second training participant through the interaction layer to perform processing on the first model parameter, a first encrypted model parameter, the second noise data, and the first encrypted noise data to obtain a first ciphertext, and transmit the first ciphertext to the training device of the first training participant, the first encrypted model parameter being obtained by encrypting the output vector of the first model;
invoke the training device of the second training participant through the interaction layer to receive a second plaintext returned by the training device of the first training participant, the second plaintext being obtained by processing a first plaintext, the output vector of the first model, and the sum of noise by the training device of the first training participant, and the first plaintext being obtained by decrypting the first ciphertext by the training device of the first training participant; and
invoke the training device of the second training participant through the interaction layer to perform error elimination processing on the second plaintext, to obtain the first transformation vector.

17. The training apparatus according to claim 15, wherein to invoke the training device of the second training participant through the interaction layer to perform vector combination processing on the first transformation vector and the second transformation vector to obtain a combined vector comprises:
invoke the training device of the second training participant through the interaction layer to perform vector splicing processing on the first transformation vector and the second transformation vector, to obtain the combined vector; or
invoke the training device of the second training participant through the interaction layer to perform weighted average combination processing on the first transformation vector and the second transformation vector, to obtain the combined vector.

18. The training apparatus according to claim 11, wherein:
the at least one model parameter of the interaction layer comprises a first model parameter corresponding to the first training participant and a second model parameter corresponding to the second training participant; and to perform back propagation processing on the federated neural network model according to the loss result corresponding to the output vector of the federated neural network model, and updating the at least one model parameter of the interaction layer according to the back propagation processing result comprises:

determine a first gradient value of the loss result relative to a first transformation vector;

obtain a preset learning rate for the federated neural network model;

determine a first model update parameter for the first training participant according to the first model parameter, the preset learning rate, the first gradient value, third noise data from the first training participant, fourth noise data from the second training participant, and first noise data;

update the first model parameter by using the first model update parameter;

determine a second gradient value of the loss result relative to a second transformation vector;

determine a product of the second gradient value and an output vector of a third model as a second model update parameter for the second training participant; and update the second model parameter by using the second model update parameter.

19. The training apparatus according to claim 13, wherein before performing forward computation processing on sample data through the first model to obtain an output vector of the first model, and the processor is further configured to execute the computer constructions to:

perform encrypted sample alignment processing on the first training participant data and the second training participant data, to obtain alignment sample data between the first training participant data and the second training participant data; and replace the sample data with the alignment sample data.

20. A non-transitory computer-readable medium for storing computer instructions, the computer instruction intended for training a federated neural network model, the federated neural network model comprising a first model corresponding to a first training participant, a second model corresponding to a second training participant, and an interaction layer, wherein the computer instructions, when executed by a processor, cause the processor to:

perform forward computation processing of sample data through the first model, to obtain an output vector of the first model;

perform forward computation processing through the interaction layer of the output vector of the first model, at least one model parameter of the interaction layer, and at least one encrypted model parameter to obtain an output vector of the interaction layer, the at least one encrypted model parameter of the interaction layer being obtained by performing linear operation-based encryption processing by the first training participant on the model parameter of the interaction layer;

perform forward computation processing on the output vector of the interaction layer through the second model, to obtain an output vector of the federated neural network model;

perform back propagation processing on the federated neural network model according to a loss result corresponding to the output vector of the federated neural network model, and update the at least one model parameter of the interaction layer, at least one parameter of the first model, and at least one parameter of the second model according to a back propagation processing result; and generate a trained federated neural network model based on the updated model parameters of the interaction layer, the first model, and the second model.

* * * * *